(12) United States Patent
Nagai et al.

(10) Patent No.: US 7,342,864 B2
(45) Date of Patent: Mar. 11, 2008

(54) OPTICAL DISK REPRODUCTION APPARATUS AND OPTICAL DISK REPRODUCTION METHOD

(75) Inventors: Yuji Nagai, Kawasaki (JP); Akihito Ogawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 596 days.

(21) Appl. No.: 10/935,183

(22) Filed: Sep. 8, 2004

(65) Prior Publication Data

US 2005/0094515 A1    May 5, 2005

(30) Foreign Application Priority Data

Sep. 10, 2003    (JP)    ............... 2003-318392

(51) Int. Cl.
*G11B 7/00*    (2006.01)
(52) U.S. Cl. ............... 369/59.26; 369/47.27; 369/47.22; 369/59.23
(58) Field of Classification Search ............ 369/47.12, 369/47.1, 47.15, 47.28, 44.13, 53.35, 59.15, 369/124.12, 47.22, 47.27, 59.23, 59.25, 59.26, 369/53.32
See application file for complete search history.

(56) References Cited

U.S. PATENT DOCUMENTS 6,345,018 B1 *    2/2002    Maegawa et al. ......... 369/44.13
6,560,175 B2 *    5/2003    Maeda et al. ............ 369/47.28
6,809,997 B2 *    10/2004   Park et al. ................. 369/47.1
6,912,190 B2 *    6/2005    Inokuchi et al. ......... 369/59.15
7,200,080 B2 *    4/2007    Matsumoto .............. 369/47.12

FOREIGN PATENT DOCUMENTS

| CN | 1206904 | 2/1999 |
|---|---|---|
| CN | 1276596 | 12/2000 |
| JP | 2001-209937 | 8/2001 |

* cited by examiner

*Primary Examiner*—Hoa T. Nguyen
*Assistant Examiner*—Kim-Kwok Chu
(74) *Attorney, Agent, or Firm*—Oblon, Spivak, McClelland, Maier & Neustadt, P.C.

(57) ABSTRACT

There are provided a wobble signal reading unit configured to read a signal corresponding to a wobble formed at a predetermined track from an optical disk on which address information is recorded by applying phase modulation to the wobble formed at the track, an address information reproducing unit configured to reproduce the address information by applying phase detecting processing to the wobble signal read at the wobble signal reading unit, and binarizing an amplitude of an obtained phase detection signal by being compared with a predetermined threshold value, and a correcting unit configured to correct asymmetry of the amplitude generated in the phase detection signal obtained by the address information reproducing unit with respect to the predetermined threshold value at the time of reading the wobble signal from the predetermined track by the wobble signal reading unit.

10 Claims, 25 Drawing Sheets

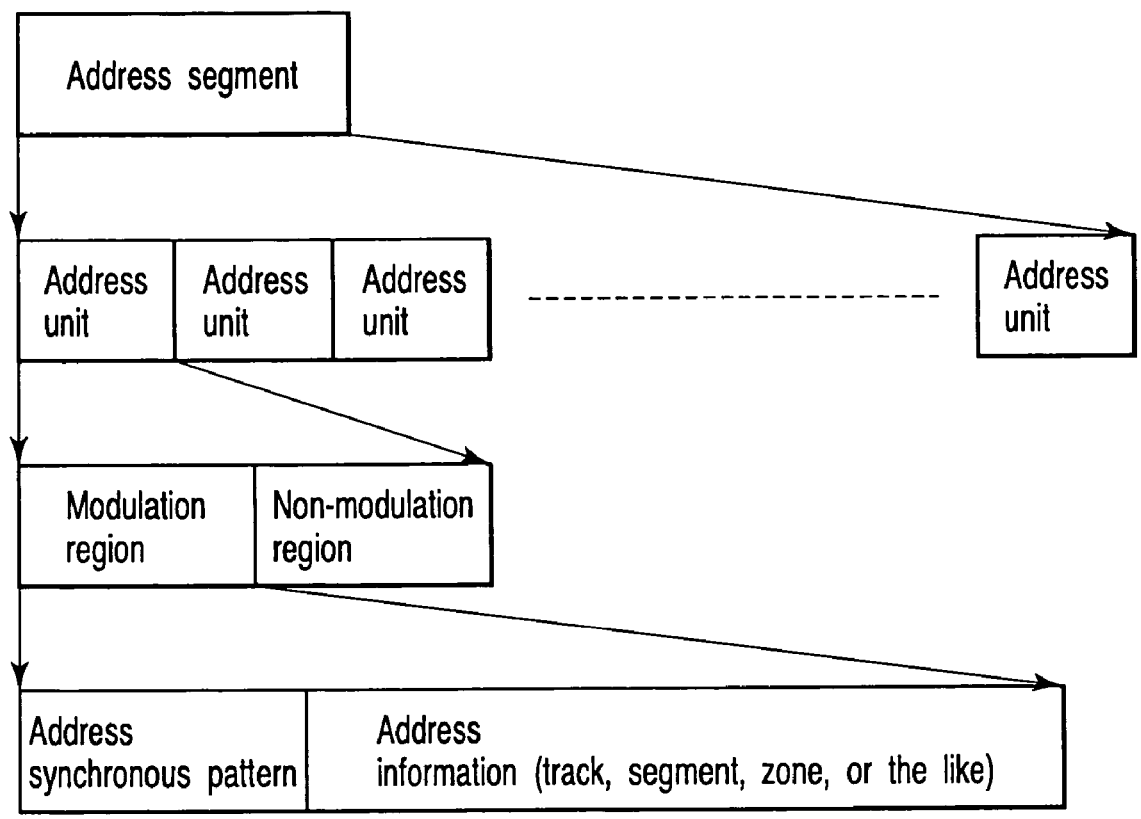
F I G. 12

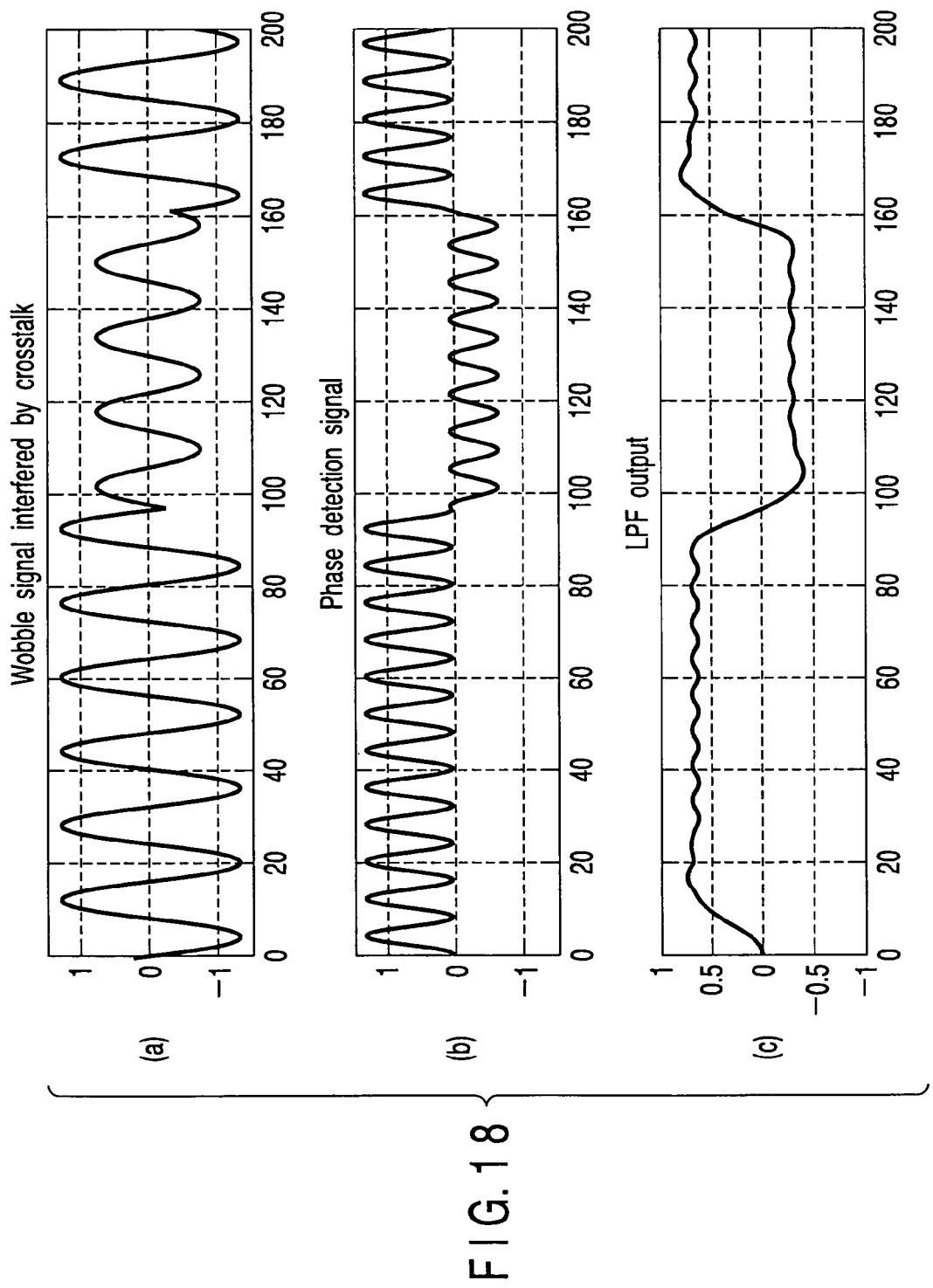
F I G. 18

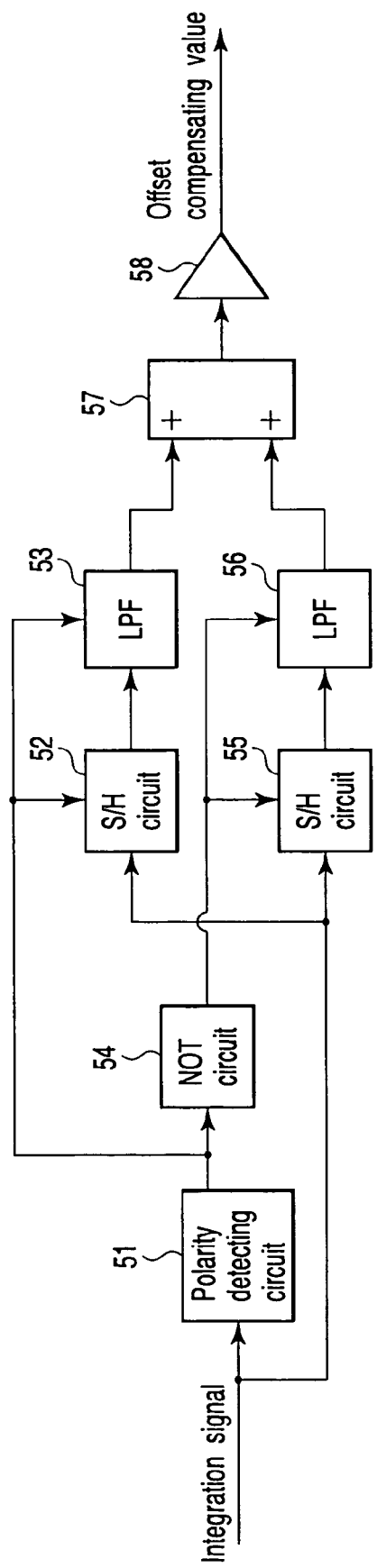
F I G. 2 5

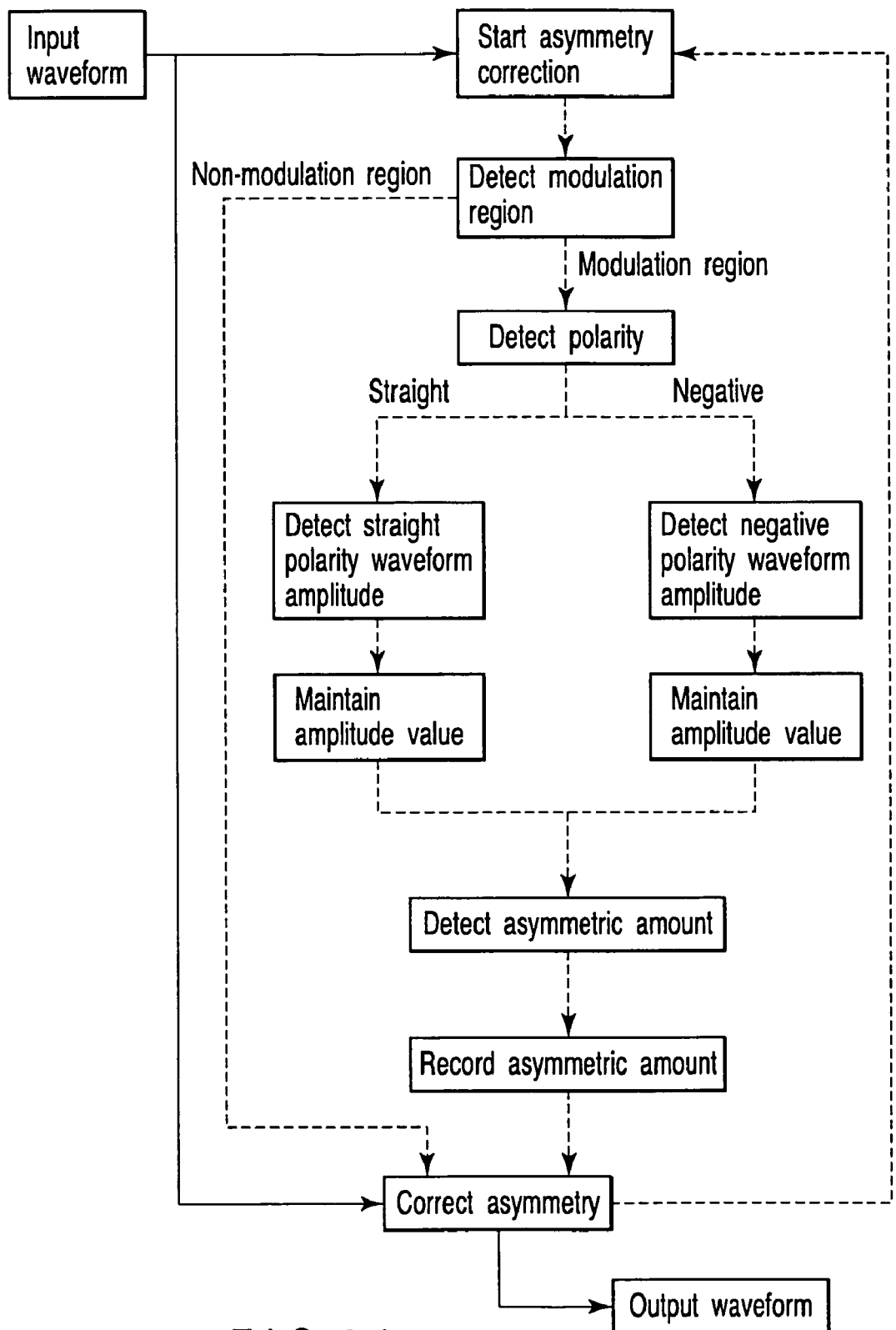
F I G. 3 1

OPTICAL DISK REPRODUCTION APPARATUS AND OPTICAL DISK REPRODUCTION METHOD

CROSS-REFERENCE TO RELATED APPLICATIONS

This application is based upon and claims the benefit of priority from prior Japanese Patent Application No. 2003-318392, filed Sep. 10, 2003, the entire contents of which are incorporated herein by reference.

BACKGROUND OF THE INVENTION

1. Field of the Invention

The present invention relates to an optical disk reproduction apparatus for reproducing an optical disk on which address information is recorded due to a wobble modulation being applied to an information recording track, and an optical disk reproduction method.

2. Description of the Related Art

As well known, in recent years, a technique of recording information at a high density has been developed, and an optical disc having a recording capacity of 4.7 GB (Giga Byte) on one side has been put to practical use.

As such an optical disc, there are DVD-ROMs (Digital Versatile Disk-Read Only Memory) which are a reproduction-only type, DVD-RAMs (Random Access Memory), DVD-RWs (Rewritable), DVD+RWs which are a rewritable type, and DVD-Rs which are a write-once type, or the like.

This type of optical disk carries out recording-reproduction of information by condensing a laser light onto an information recording layer formed on a transparent substrate. In this case, a track formed from a physical concave portion or convex portion is formed on the information recording layer of the optical disk, and the recording-reproducing of information is carried out along this track.

Further, a physical address, which is positional information for specifying a three-dimensional position at which information is recorded and reproduced, is recorded on the track. In a DVD-RAM, recording of a physical address is carried out by forming pre-pits formed from minute concave/convex at each predetermined track length.

In contrast thereto, in a DVD+RW, a physical address is recorded by utilizing so-called wobble modulation in which a track is made to meander (wobble) slightly in the radial direction of the optical disk, and frequency modulation or phase modulation is applied to the wobble.

Such means for recording a physical address due to the wobble modulation can broadly occupy a region on which user information is recorded because the track is not cut off as compared with means for forming pre-pits on the way of the track, and has the advantage that formatting efficiency is high, and the advantage that it is highly compatible with a reproduction-only medium.

In order to reproduce an physical address from the wobble to which phase modulation has been applied, there is a technique in which, after a wobble waveform which has been phase-detected by using a synchronous detecting method, a delay detecting method, or the like is made to pass through an integrator, an LPF (Low Pass Filter), or the like, it is determined a binary code denoting an physical address due to the wobble waveform being compared with a predetermined threshold value.

Further, there is a technique in which a physical address is reproduced by directly integrating a wobble signal by using a clock synchronous with the wobble. For example, in Jpn. Pat. Appln. KOKAI Publication No. 2001-209937, a phase detection signal is integrated for a predetermined interval zone by an integral timing signal, and phase modulation is carried out by comparing the output value with a fixed threshold value.

However, in the art of Jpn. Pat. Appln. KOKAI Publication No. 2001-209937, because the integral value of the phase detection signal is compared with a predetermined fixed threshold value, there is the possibility that an error of determining a code of a physical address arises when a level of the phase detection signal fluctuates, or the like.

In an optical disk such as a DVD-R, in which recording-reproduction is carried out by a CLV (Constant Linear Velocity) system, the phase relationships of the wobbles between adjacent tracks differ in accordance with the radial position.

Therefore, a phase and an amplitude of a wobble signal reproduced from a predetermined track fluctuates in accordance with the crosstalk due to the wobbles of the adjacent tracks. If the phase and the amplitude of the wobble signal fluctuates, because asymmetry arises in the waveform due to the amplitude and the central level of the phase detection signal being fluctuated, there is the possibility that an error of determining a binary code arises in comparison with a fixed threshold value.

BRIEF SUMMARY OF THE INVENTION

According to one aspect of the present invention, there is provided an optical disk reproduction apparatus comprising: a wobble signal reading unit configured to read a signal corresponding to a wobble formed at a predetermined track from an optical disk on which address information is recorded by applying phase modulation to the wobble formed at the track; an address information reproduction unit configured to reproduce the address information by applying phase detection processing to the wobble signal read at the wobble signal reading unit, and by binarizing an amplitude of an obtained phase detection signal by being compared with a predetermined threshold value; and a correcting unit configured to correct asymmetry of the amplitude generated in the phase detection signal obtained at the address information reproduction unit with respect to the predetermined threshold value at the time of reading the wobble signal from the predetermined track by the wobble signal reading unit.

According to another aspect of the present invention, there is provided an optical disk reproduction method comprising: reading a signal corresponding to a wobble formed at a predetermined track from an optical disk on which address information is recorded by applying phase modulation to the wobble formed at the track; reproducing the address information by applying phase detecting processing to the read wobble signal, and by binarizing an amplitude of an obtained phase detection signal by being compared with a predetermined threshold value; and correcting asymmetry of the amplitude generated in the phase detection signal with respect to the predetermined threshold value at the time of reading the wobble signal from the predetermined track.

BRIEF DESCRIPTION OF THE SEVERAL VIEWS OF THE DRAWING

FIG. 12 is a diagram for explaining an address segment recorded on a track constituting the segment by wobble modulation;

FIG. 18 is a diagram for explaining signal waveforms in which a wobble signal interfered by the wobble signals from the adjacent tracks is binarized;

FIG. 25 is a block diagram for explaining an example of an offset detecting circuit in the offset control circuit;

FIG. 31 is a flowchart for explaining an asymmetry correction operation in the optical disk apparatus.

DETAILED DESCRIPTION OF THE INVENTION

Hereinafter, an embodiment of the present invention will be described in detail with reference to the drawings.

Basic Description of Optical Disk Apparatus

Figure 1:
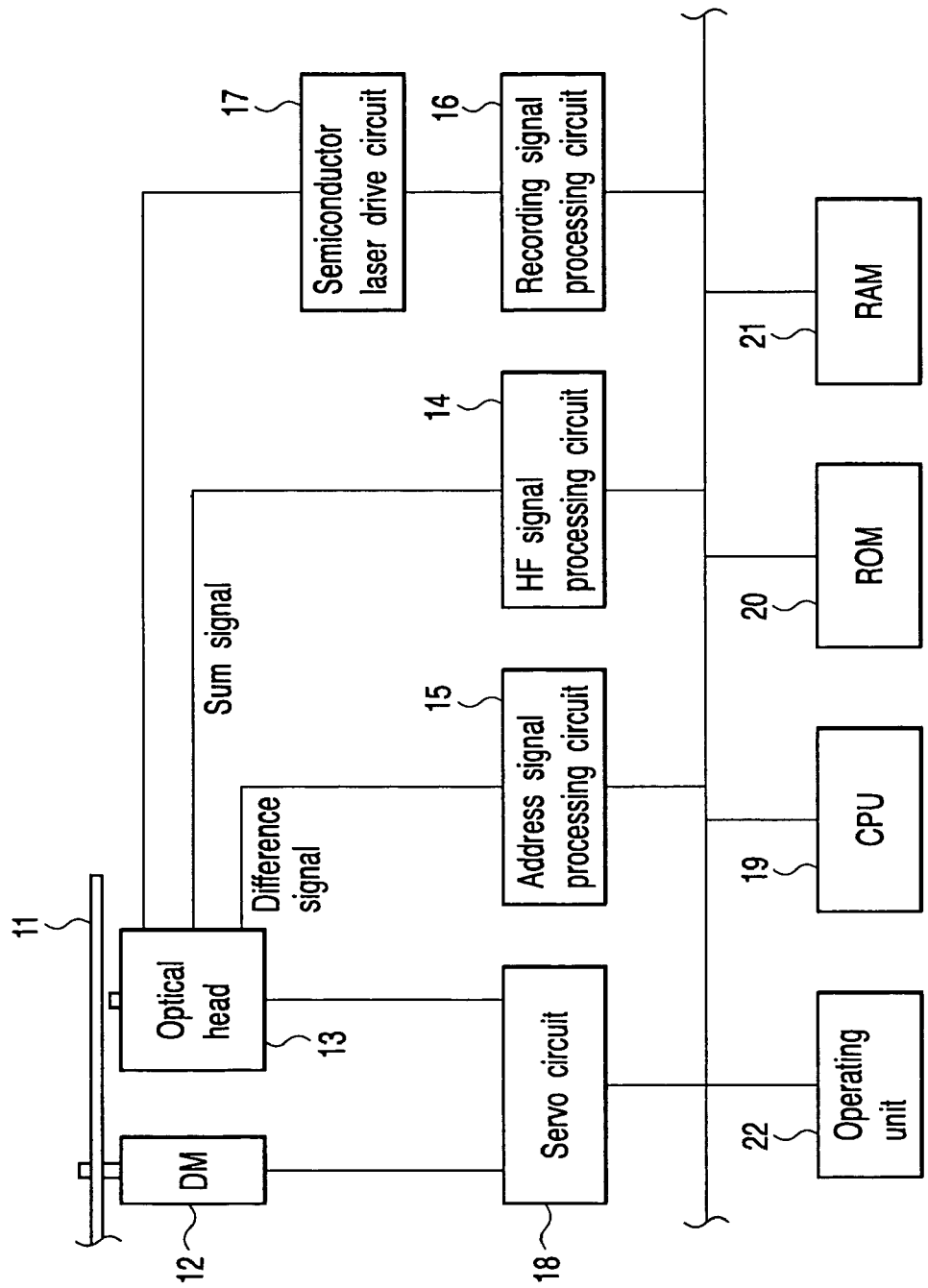
FIG. 1 shows one embodiment of the present invention, and is a block diagram for explaining an outline of an optical disk apparatus.

FIG. 1 shows an outline of an optical disk apparatus which will be described in this embodiment. That is, reference numeral 11 denotes a rewritable optical disk. The optical disk 11 is rotatedly driven by a disk motor 12. In this rotating state, recording or reproduction of information is carried out with respect to the optical disk 11 by an optical head 13 which is supported so as to be movable in the radial direction.

The optical head 13 condenses a laser light emitted from a semiconductor laser installed therein onto an information recording layer of the optical disk 11, and the reflected light is condensed by a PD (Photo Detector) which will be described later.

The light receiving region of the PD is optically divided into two in the radial direction of the optical disk 11, and the optical head 13 outputs a sum signal in which respective output signals of the two light receiving regions are added up, and a difference signal into which a difference of the respective output signals of the two light receiving regions is taken.

Then, due to the sum signal output from the optical head 13 being supplied to an HF (High Frequency) signal processing circuit 14, various signals such as a main picture, sub-picture, audio signals, or the like are demodulated. These signals are output to the exterior of the optical disk apparatus and supplied for image display or audio reproduction, and here, reproduction of information with respect to the optical disk 11 is carried out.

Further, the difference signal output from the optical head 13 is called a radial push-pull signal, and is a wobble signal corresponding to a wobble of a predetermined track. Due to the wobble signal being supplied to an address signal processing circuit 15, a physical address denoting a position on the optical disk 11 is obtained.

On the other hand, the information to be recorded on the optical disk 11 is supplied to a recording signal processing circuit 16 from the exterior of the optical disk apparatus. The recording signal processing circuit 16 converts a recording signal supplied from the exterior into a format suitable for being recorded into the optical disk 11, and outputs the recording signal to a semiconductor laser drive circuit 17.

Further, due to the semiconductor laser drive circuit 17 controlling the semiconductor laser in the optical head 13 based on the recording signal output from the recording signal processing circuit 16, the recording signal is written into the optical disk 11, and here, information recording with respect to the optical disk is carried out.

Note that the rotation control of the above-described disk motor 12, the control of the optical disk 11 of the optical head 13 in the radial direction, the control in a tracking direction or a focusing direction with respect to an objective lens in the optical head 13, or the like are carried out by a servo circuit 18.

A series of recording-reproducing operations with respect to the optical disk described above are generally controlled by a CPU (Central Processing Unit) 19. The CPU 19 controls a recording-reproduction position of information with respect to the optical disk 11 based on the physical address obtained from the address signal processing circuit 15.

In this case, the CPU 19 controls respective circuits so as to reflect the contents of operations of an operating unit 22 while using a RAM 21 as a work area based on a control program stored in a ROM 20.

Figure 2:
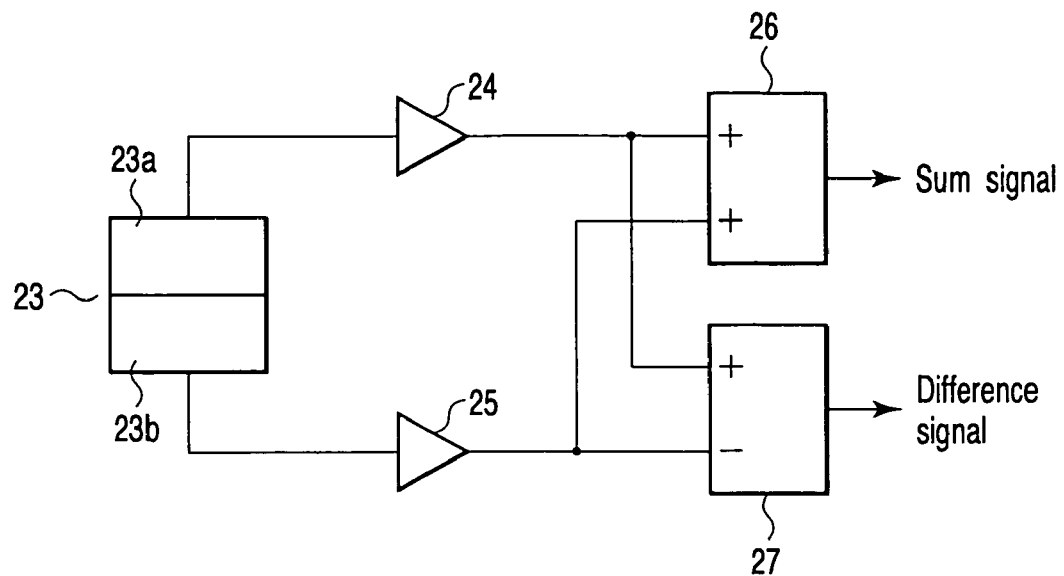
FIG. 2 is a block diagram for explaining an example of means for generating a sum signal and a difference signal in an optical head of the optical disk apparatus.

FIG. 2 shows means for generating a sum signal and a difference signal in the above-described optical head 13. That is, as described above, the PD 23 has two light receiving regions 23a and 23b optically divided in the radial direction of the optical disk 11.

Then, a sum signal is generated due to a signal into which an output from the one light receiving region 23a is amplified by an amplifier 24 and a signal into which an output from the other light receiving region 23b is amplified by an amplifier 25 being added up at an adder 26.

Further, a difference signal is generated due to a signal into which an output from the other light receiving region 23b is amplified by the amplifier 25 is subtracted from a signal into which an output from the one light receiving region 23a is amplified by the amplifier 24 at a subtracter 27.

Figure 3:
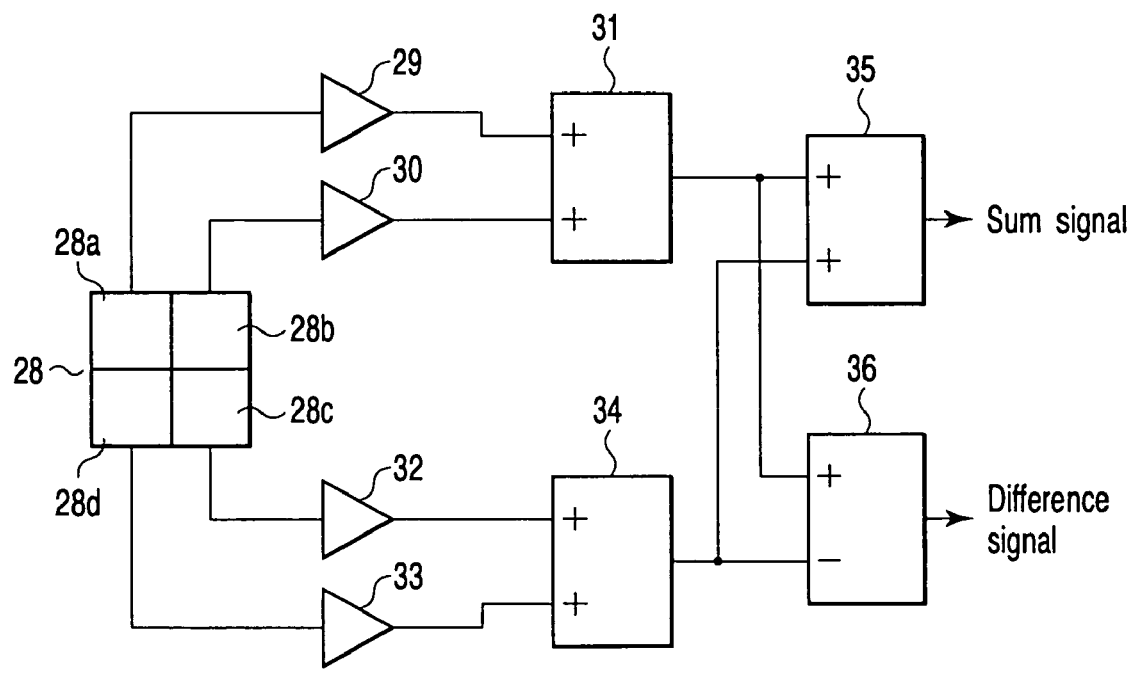
FIG. 3 is a block diagram for explaining another example of means for generating a sum signal and a difference signal in the optical head of the optical disk apparatus.

Note that, as shown in FIG. 3, there are cases in which four light receiving regions 28a to 28d in which a PD 28 in the optical head 13 is optically divided into two in the radial direction of the optical disk 11, and divided into two in the tangential direction thereof are provided.

In this case, signals into which respective outputs from the two light receiving regions 28a and 28b divided into the tangential direction of the optical disk 11 are respectively amplified by amplifiers 29 and 30 are added up at an adder 31. Further, signals in which the respective outputs from the two light receiving regions 28c and 28d divided into the tangential direction of the optical disk 11 are respectively amplified by amplifiers 32 and 33 are added up at an adder 34.

Then, a sum signal is generated due to an output signal of the adder 31 and an output signal of the adder 34 being added up at an adder 35. Further, a difference signal is generated due to an output signal of the adder 34 being subtracted from an output signal of the adder 31 at a subtracter 36.

Description of Optical Disk and Land-and-Groove Recording

Here, the optical disk 11 has a guiding groove called a groove at an information recording area of the information recording layer formed on the transparent substrate. The concave/convex configuration formed by forming the guiding groove is called a track, and recording-reproducing of information is carried out along this track.

Figure 4:
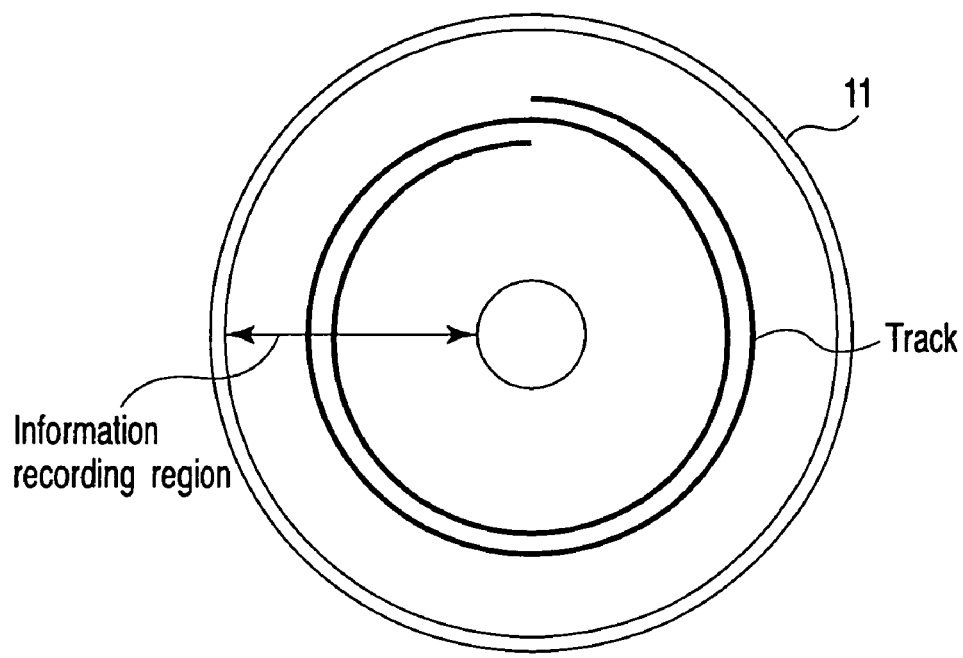
FIG. 4 is a diagram for explaining a track configuration of an optical disk used for the optical disk apparatus.

As the track, there are a spiral type which continuously ranges from the inner peripheral side to the outer peripheral side of the optical disk 11 as shown in FIG. 4, and a concentric circle type formed from a plurality of concentric circles.

Figure 5:
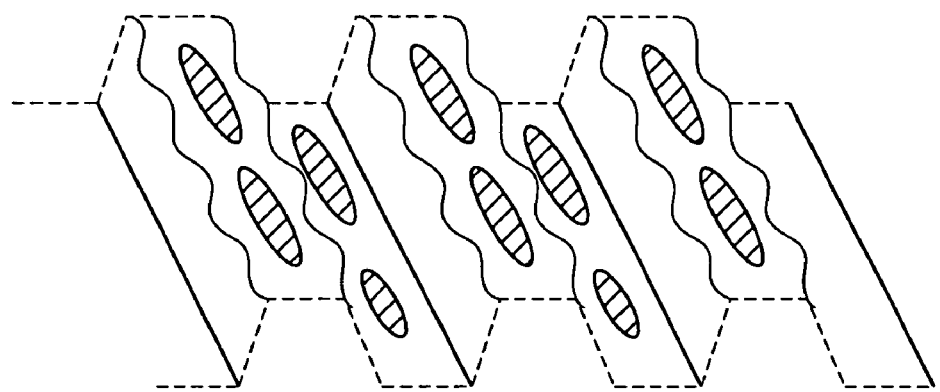
FIG. 5 is a perspective view for explaining an example of an information recording mode with respect to a track in the optical disk.
Figure 6:
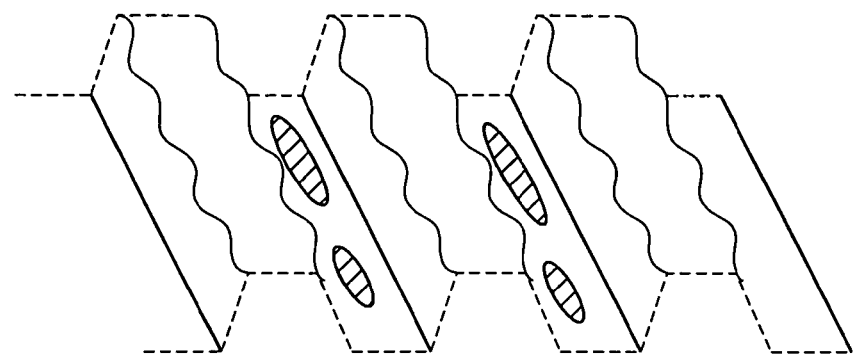
FIG. 6 is a perspective view for explaining another example of an information recording mode with respect to a track in the optical disk.

FIGS. 5 and 6 show the enlarged track. The track is formed from concave/convex areas of the information recording layer, and one side thereof is called a groove track, and the other side is called a land track.

In a DVD-RAM, as shown in FIG. 5, information can be recorded by forming marks due to a change of phase on both of the land track and the groove track. Further, in a DVD+RW or the like, as shown in FIG. 6, information can be recorded by forming marks due to a change of phase solely on the groove track.

Description of Relationship Between Wobble Signal and Push-Pull

Figure 7:
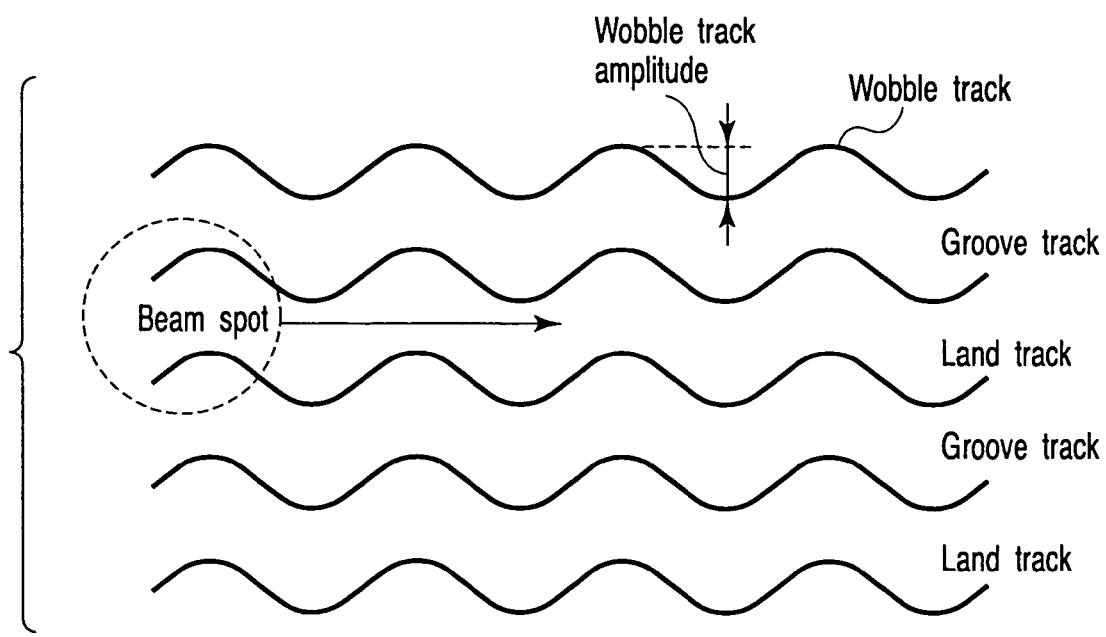
FIG. 7 is a diagram for explaining a relationship between wobbles of tracks and a beam spot in the optical disk.

FIG. 7 shows a plan view of the track. The track of the optical disk 11 slightly meanders in the radial direction, and this is called wobble. As a condensed beam spot is scanned along the wobbled track, because the frequency of the wobble is a frequency higher than a frequency band of a tracking servo signal, the beam spot is directed substantially at the center of the track.

At this time, a sum signal hardly varies, and only a difference signal in the radial direction, i.e., a radial push-pull signal varies in accordance with the wobble. This is called a wobble signal. The wobble signal is utilized for adjustment of the rotational frequency of the disk motor 12, for the reference of a recording clock, and as physical address information.

Figure 8:
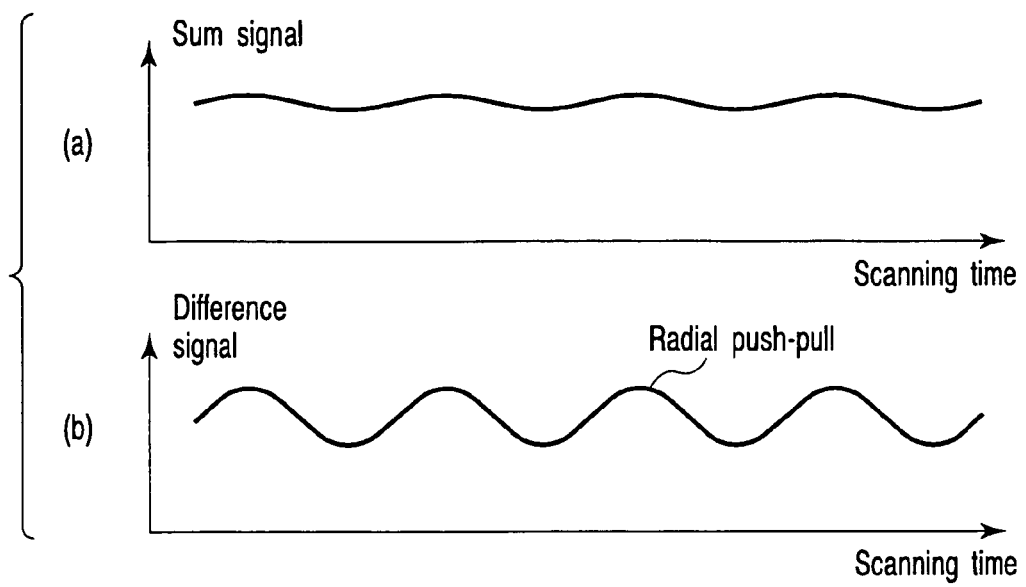
FIG. 8 is a diagram for explaining a relationship between a sum signal and a difference signal generated by the optical head of the optical disk apparatus.

Mark (a) of FIG. 8 denotes a sum signal, and mark (b) of FIG. 8 denotes a difference signal, i.e., a radial push-pull signal (wobble signal).

Description of Wobble Signal

In the optical disk 11, physical address information denoting a physical position at the information recording region of the optical disk 11 is recorded by modulating the wobble signal.

Figure 9:
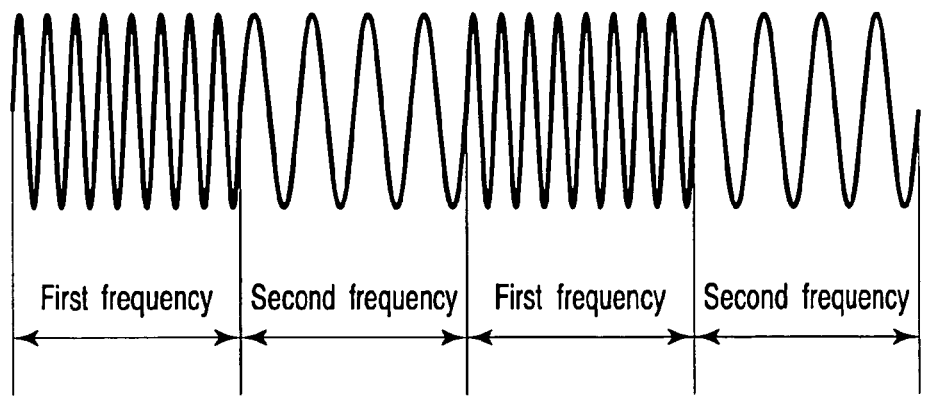
FIG. 9 is a diagram for explaining frequency modulation applied to the wobbles of the tracks in the optical disk.
Figure 10:
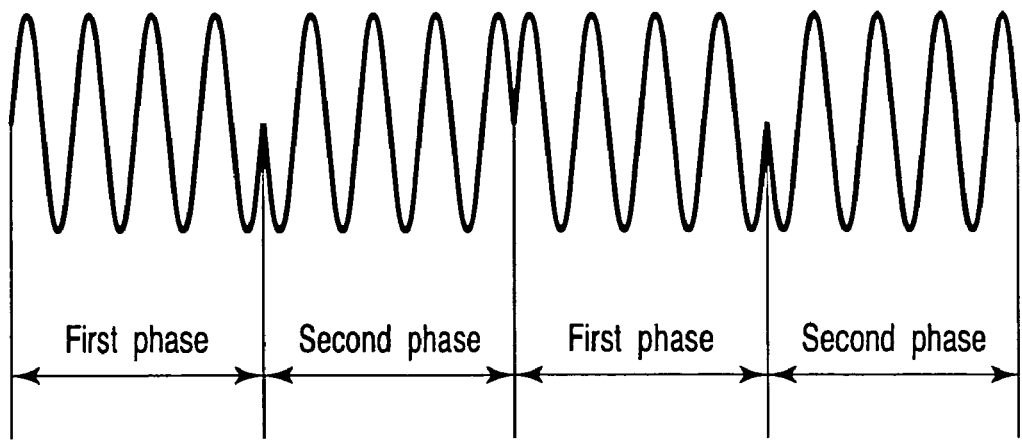
FIG. 10 is a diagram for explaining a phase modulation applied to the wobbles of the tracks in the optical disk.

That is, there are a technique in which, as shown in FIG. 9, physical address information is recorded by applying frequency modulation in which two frequencies; a first frequency and a second frequency, whose frequencies are different from each other, are switched, with respect to the wobble provided to the track, and a technique in which, as shown in FIG. 10, physical address information is recorded by applying frequency modulation in which a first phase and a second phase whose phases are respectively inverted are switched, with respect to the wobble provided to the track.

Figure 13:
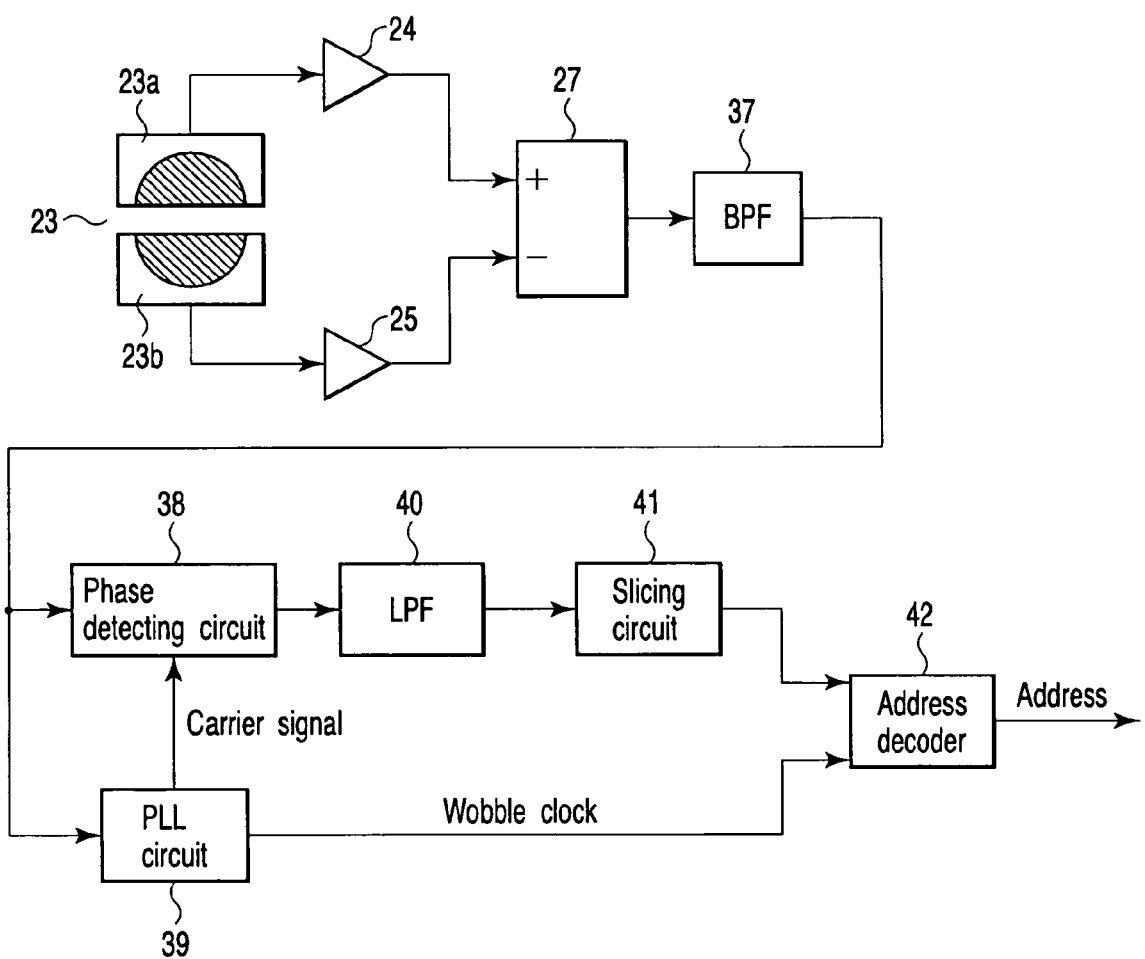
FIG. 13 is a block diagram for explaining an example of an address signal processing circuit for obtaining physical address information from a wobble signal to which phase modulation is applied.

Although the details thereof will be described later, the recorded physical address information can be read by using, for example, a demodulator as shown in FIG. 13.

Figure 11:
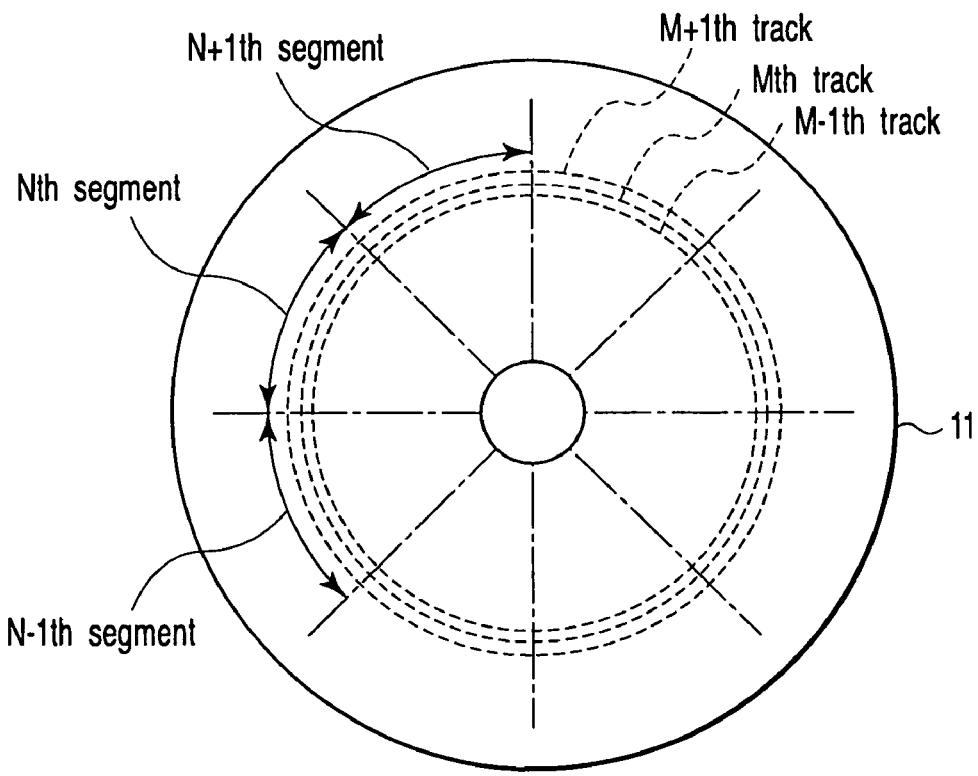
FIG. 11 is a diagram for explaining that the tracks formed on the optical disk are partitioned into each given length segment.

FIG. 11 shows a configuration of the information recording region of the optical disk 11. In the optical disk 11, the recording tracks are partitioned by each address segment of a predetermined length in order to specify a physical position of the information recording region. Information denoting an address or the like has been recorded in advance in each address segment by wobble modulation in order to denote a physical address.

The address segment by wobble modulation is configured, for example, as shown in FIG. 12. In FIG. 12, the address segment is composed of a plurality of address units, and each address unit is formed from a modulation region and an non-modulation region.

Then, at the modulation region, a synchronous pattern used for generating the timing of reproducing an address and address information (a segment, a track, a zone, or the like) are recorded by wobble modulation. A ratio of the modulation region and the non-modulation region depends on a frequency of the wobble, a length of an address segment, and address information recorded for each address segment.

Description of Phase Modulating Method

FIG. 13 shows an example of the address signal processing circuit 15, which is shown in FIG. 1, for obtaining physical address information from a wobble signal to which phase modulation is applied. Noise characteristics of a recording medium, crosstalk noise from HF signals recorded on the adjacent tracks, or the like are included in the wobble signal.

Therefore, it is necessary to eliminate the noise other than the frequency band of the wobble signal due to the wobble signal generated at the aforementioned subtracter 27 being made to pass through a BPF (Band Pass Filter) 37. Because a frequency of a waveform at the phase changing point is different from the frequency of the wobble signal, an attenuation in an amplitude arises by the BPF processing at the phase changing point.

Figure 14:
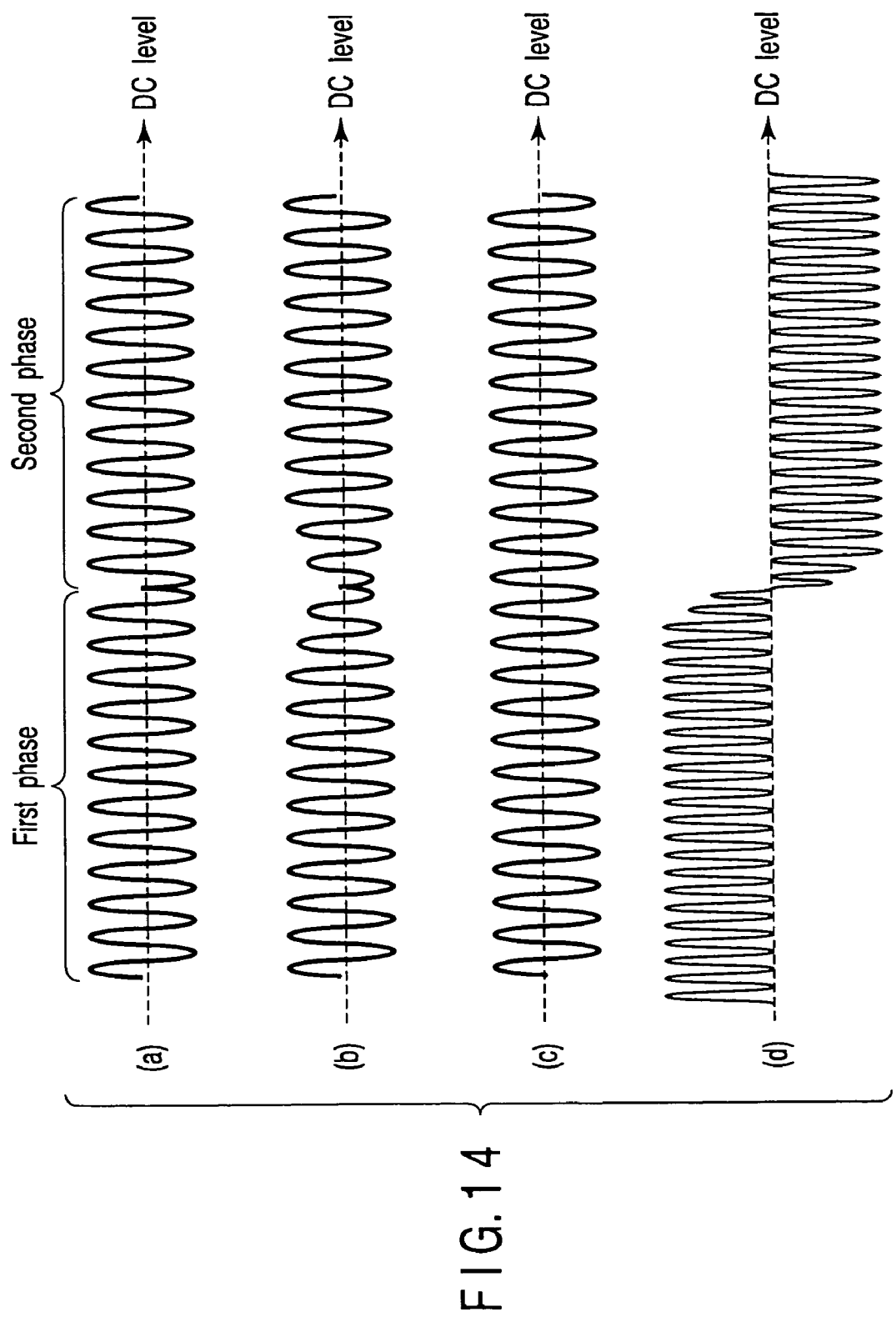
FIG. 14 is a waveform chart for explaining signal waveforms of respective portions in one example of the address signal processing circuit.

Mark (a) of FIG. 14 denotes the wobble signal to which phase modulation is applied and which is output from the subtracter 27, and mark (b) of FIG. 14 denotes a signal waveform in which the wobble signal shown in the mark (a) of the same diagram is made to pass through the BPF 37. It can be understood that the amplitude is attenuated at the phase changing point.

The wobble signal from which noise is eliminated by the BPF 37 is supplied to a phase detecting circuit 38, and is input to a PLL (Phase Locked Loop) circuit 39 in order to generate a carrier signal.

Of these, at the PLL circuit 39, phase locking processing with respect to the input wobble signal is carried out, and a carrier signal, as shown by mark (c) of FIG. 14, which is phase-locked with the wobble signal, and a wobble clock are generated.

Further, at the phase detecting circuit 38, phase detecting processing is carried out by the wobble signal and a carrier signal synchronous therewith. Here, as the phase detecting processing, a technique in which a polarity of a phase is determined by multiplying a wobble signal and a carrier signal is used. In this case, the wobble signal is detected in a form in which the levels are made to be offset at the first phase and the second phase, as shown by mark (d) of FIG. 14 by being multiplied by the carrier signal.

Therefore, high frequency components are eliminated by using an LPF 40 from the signal generated by this phase detecting processing. Then, the signal output from the LPF 40 is binarized by being compared with a predetermined threshold value level by a slicing circuit 41.

In order to obtain the bit information of the address from the binary waveform, a clock synchronous with an address bit (hereinafter, a symbol clock) is required. At an address decoder 42, by using the wobble clock which is output from the PLL circuit 39 and is synchronous with a wobble period, and the binary signal output from the slicing circuit 41, a clock synchronous with a symbol clock is generated, and the address is reproduced.

Figure 15:
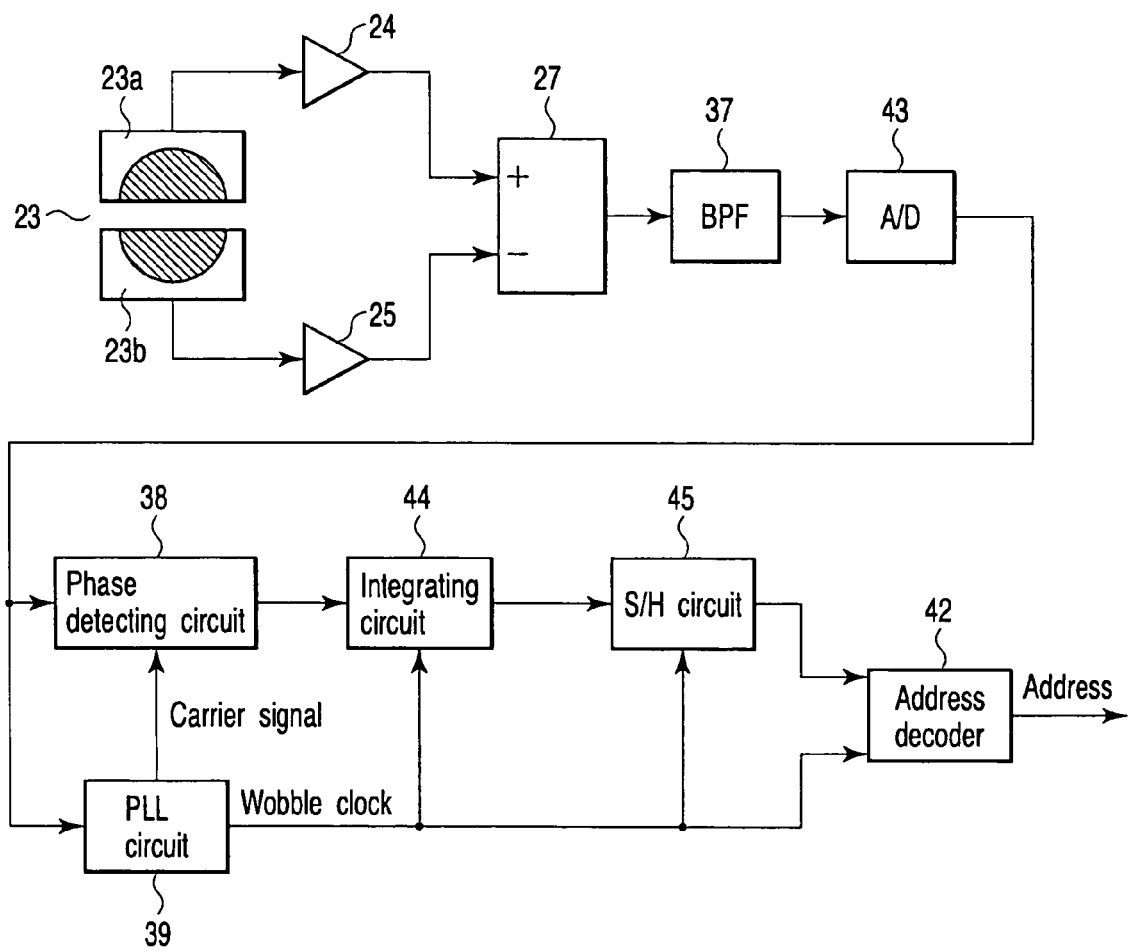
FIG. 15 is a block diagram for explaining another example of an address signal processing circuit for obtaining physical address information from a wobble signal to which phase modulation is applied.

Further, when the address signal processing circuit 15 shown in FIG. 1 is configured by digital processing, a configuration as shown in FIG. 15 can be obtained. In FIG. 15, portions which are the same as those of FIG. 13 are denoted by the same reference numerals and will not be described. That is, the wobble signal which has passed through the BPF 37 is converted into a digital signal by an A/D (Analog/Digital) converter 43.

The wobble signal which has been converted into the digital signal is phase-detected in the same way as described above by the phase detecting circuit 38 and the PLL circuit 39 which correspond to digital processing. The phase-detected waveform is processed to be integrated in wobble clock units by an integrating circuit 44. This processing has the same effect as the LPF 40.

Then, the integral waveform is supplied to an S/H (Sample/Hold) circuit 45 and is sampled-and-held by the wobble clock, and thereafter, due to the waveform being input to the address decoder 42 corresponding to digital processing, a clock synchronous with a symbol clock is generated and the address is reproduced.

Effect of Crosstalk Due to Adjacent Wobbles

However, when a recording density in the radial direction is made higher in order to increase a recording capacity, the diameter of a beam spot is made relatively larger than a track pitch, not only the wobble signal at the track to be originally scanned, but also wobble signals in the adjacent tracks can be obtained. Accordingly, there are cases in which the obtained wobble signals interfere with one another, which greatly affects the amplitude and phase of the wobble signal.

Figure 16:
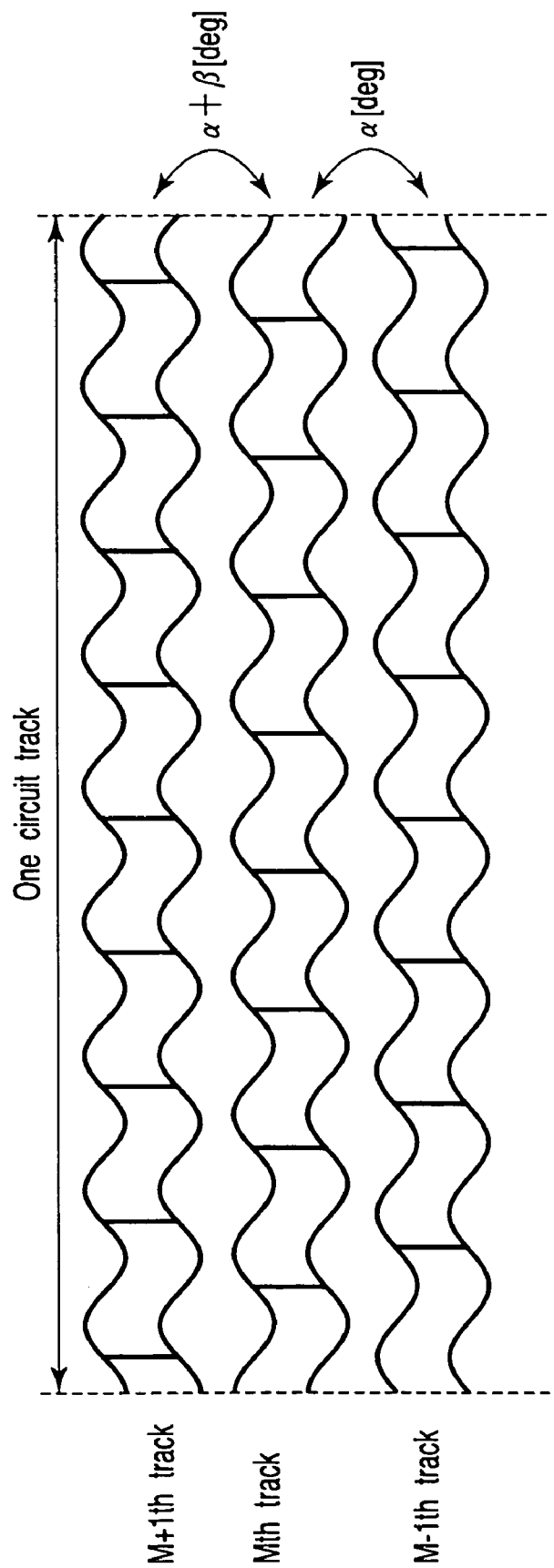
FIG. 16 is a diagram for explaining that a phase difference arises in the wobbles between a predetermined track and adjacent tracks at the inner peripheral side and the outer peripheral side thereof on the optical disk.

For example, in an optical disk such as a write-once optical type disk (DVD-R or the like) in which recording-reproduction is carried out by a CLV method corresponds thereto, because the wobble phases are not unified in the radial direction. In the CLV recording-reproduction method, as shown in FIG. 16, a phase difference arises in the wobbles between the self-track and the adjacent tracks at the inner peripheral side and the outer peripheral side.

Due to the phase difference of the wobbles, the wobble signal read from the self-track is affected by the wobble signals of the adjacent tracks, and the amplitude and the phase thereof are varied. This variation is called a wobble beat.

Given that a phase difference between the inner peripheral side wobble and the self-wobble is $\alpha$, a phase difference between the self-wobble and the outer peripheral side wobble can be expressed by $\alpha+\beta$. A value of $\beta$ is determined in accordance with a wobble length and a track pitch.

For example, in the optical disk 11 in which a wobble length WL is 9.486 μm, and a track pitch PT is 0.4 μm, $$\beta = 2\pi \times (TP/WL) \times 360$$
$$= 2\pi \times (0.4/9.486) \times 360$$
$$= 95.3 \text{ deg.}$$

Further, if $\alpha$ is defined by that an initial phase difference between a wobble of the innermost peripheral track and a wobble adjacent thereto is a0, and a track number is N, $\alpha$ can be expressed by $$\alpha = a0 + [N \times (\beta - 1)] deg.$$

In this case, the phase difference between the self-track and the adjacent track circulates at a period of substantially four rounds of the track. That is, the period of the wobble beat is determined by a value of β, and when converted into a track, 360/β tracks equal one period.

However, when the wobble beat is observed on the frequency axis, because the wobble beat is generated by a wobble phase difference between the tracks, the frequency of the wobble beat increases towards the inner peripheral side of the optical disk 11, where the track length becomes shorter.

Figure 17:
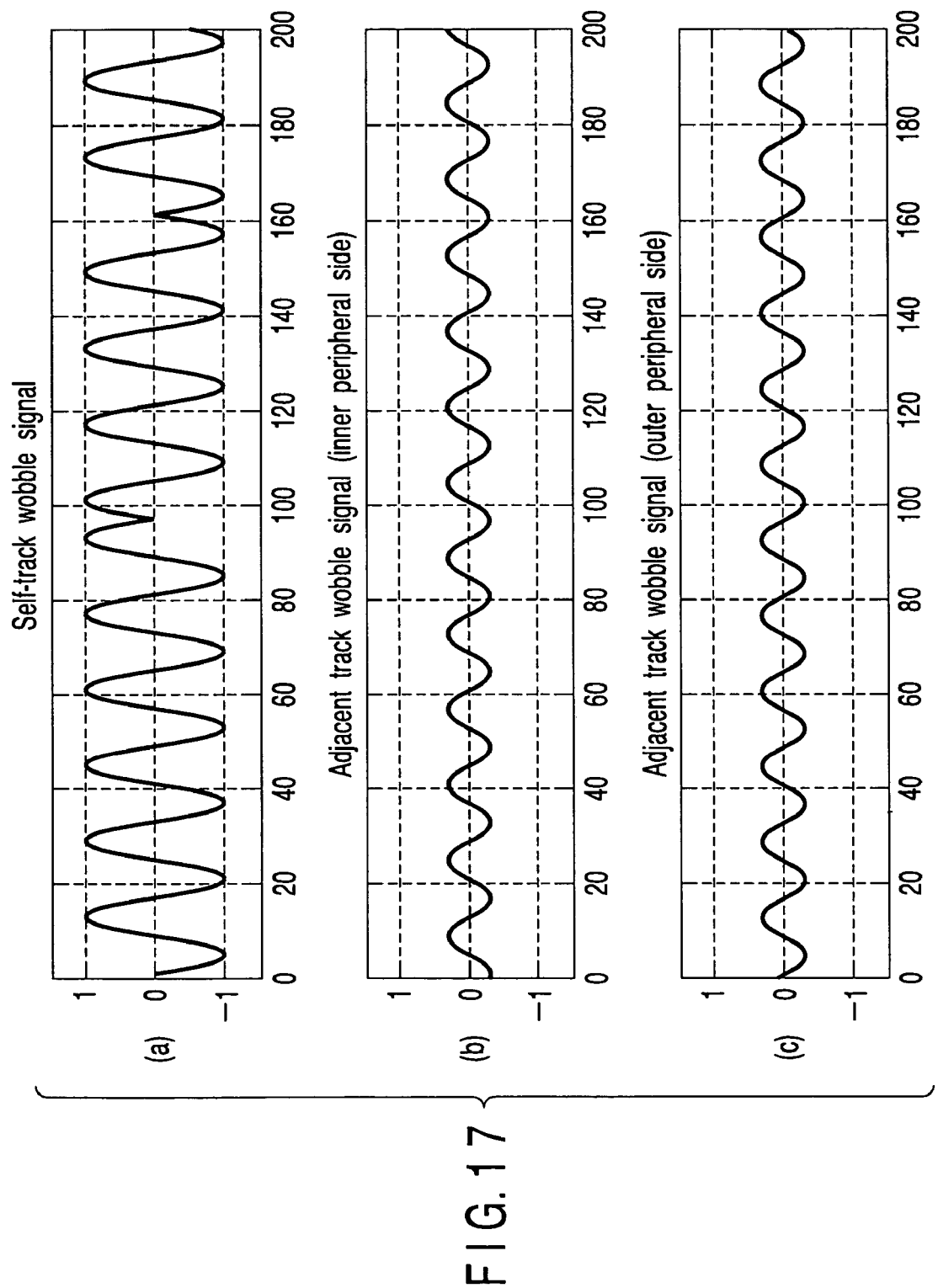
FIG. 17 is a diagram for explaining a relationship a wobble signal obtained from the predetermined track and wobble signals obtained from the adjacent tracks in the optical disk.

Marks (a) to (c) of FIG. 17 show the phase relationship of the phases of the wobble signals when α=90, and β=185.3, and marks (a) to (c) of FIG. 18 show the wobble signals including interference of the wobble signals from the adjacent track, and the phase detection waveforms at that time.

Note that the amplitude of the wobble signal from the adjacent tracks is 30% as compared with the time of reproducing the wobble amplitude of the self-track. It can be understood that, because the amplitudes and the phases of the wobble signals at the first phase and the second phase are respectively affected by crosstalk of the wobbles from the adjacent tracks, asymmetry arises in the signal level of the phase detection waveform.

In this case, in the address signal processing circuit 15 having the configuration shown in FIGS. 13 and 15, because means for correcting asymmetry of the phase detection waveform is not provided, when a ratio of a signal and a noise in the wobble signal deteriorates by the effect due to a noise characteristic to a medium, or an HF signal recorded on the adjacent track, or the like, there is brought about the possibility that the binary value is wrongly determined.

Figure 19:
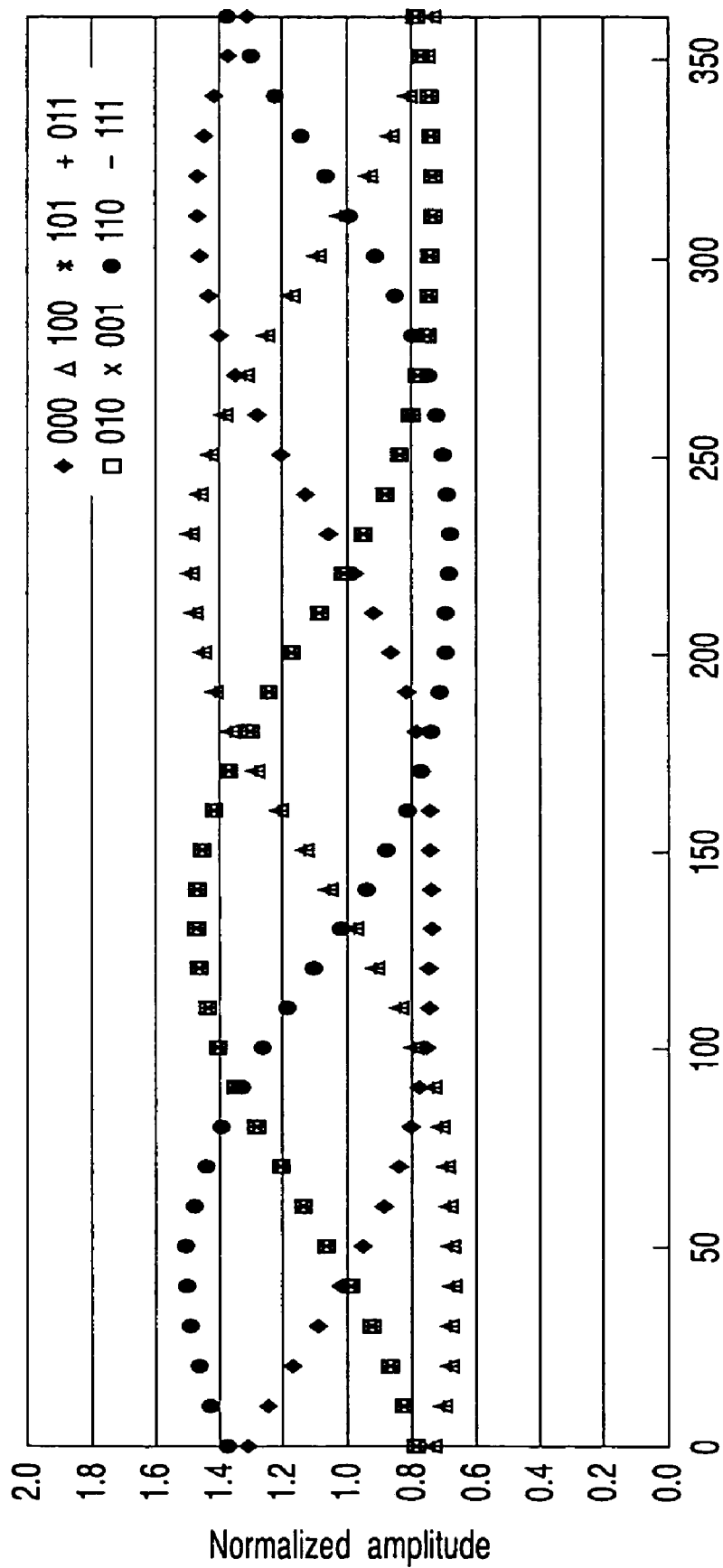
FIG. 19 is a diagram for explaining variations in an amplitude of a wobble signal in accordance with wobble phase differences with the adjacent tracks.
Figure 20:
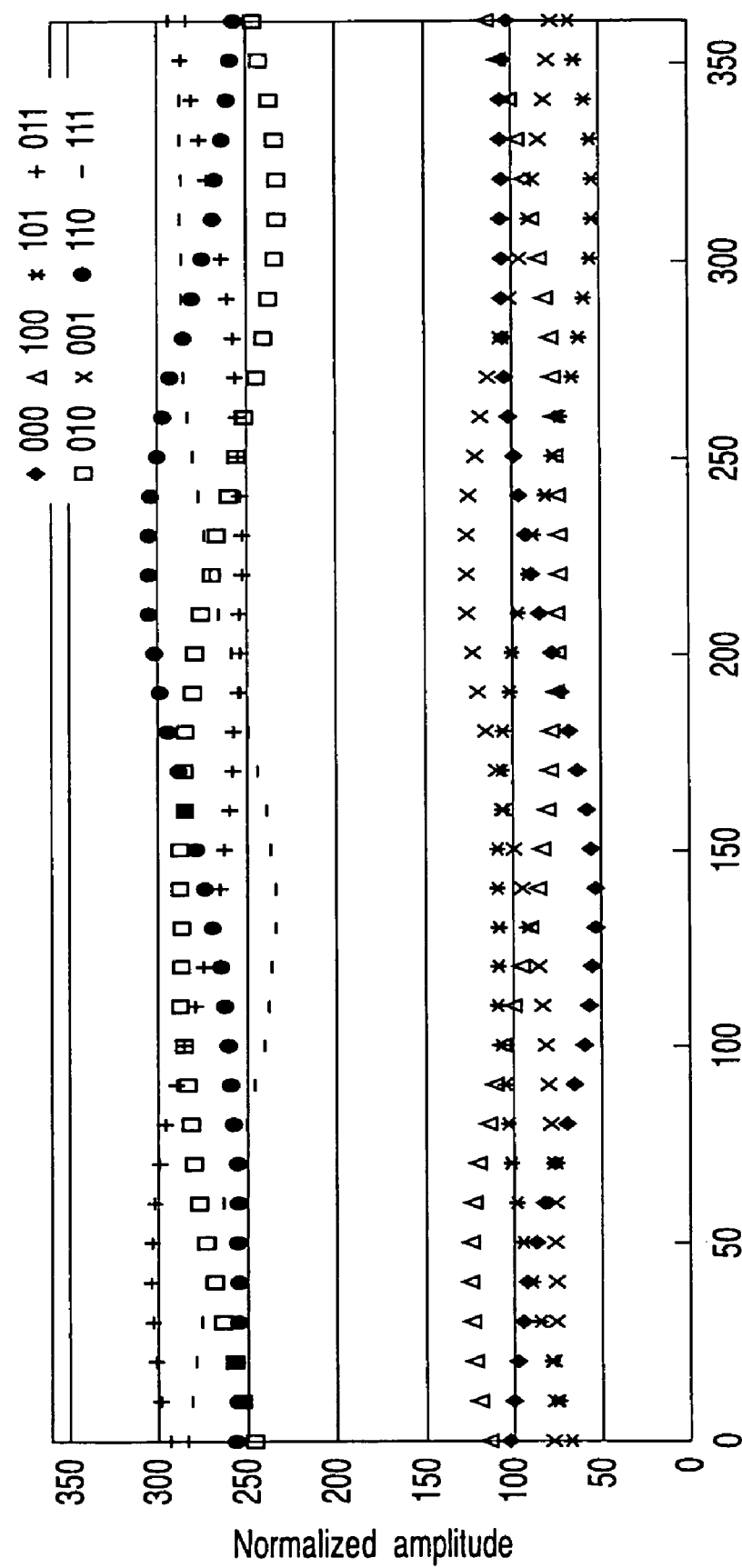
FIG. 20 is a diagram for explaining variations in a phase of a wobble signal in accordance with wobble phase differences with the adjacent tracks.
Figure 21:
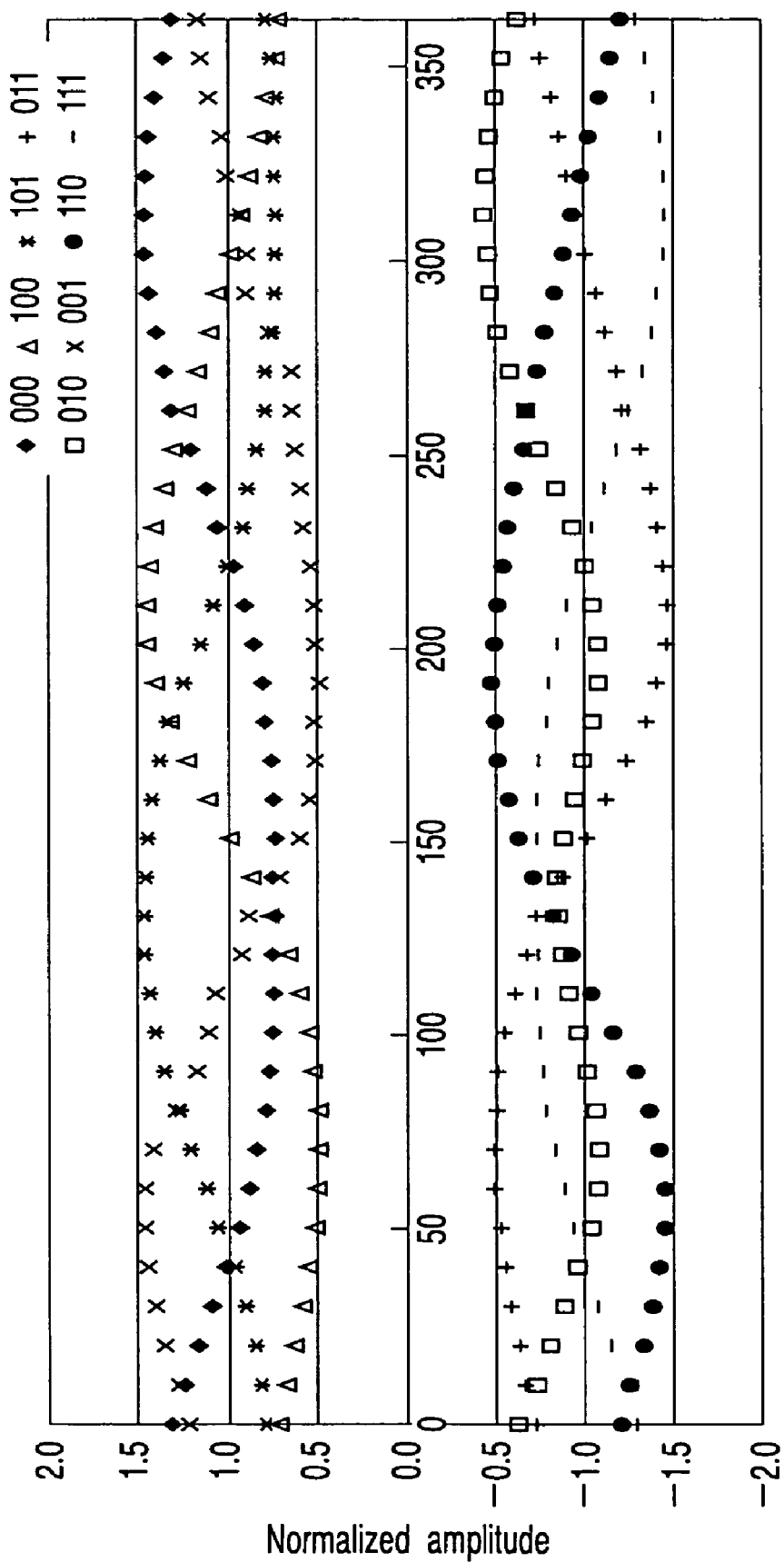
FIG. 21 is a diagram for explaining variations in a phase detection amplitude of a wobble signal in accordance with wobble phase differences with the adjacent tracks.

FIG. 19 shows variations in a wobble amplitude when α is varied within a range of 0 to 360 deg, and FIG. 20 shows variations in a wobble phase, and FIG. 21 shows variations in a phase detection waveform. In FIGS. 19 to 21, three digit numerals at the right sides thereof respectively show the modulation phases of the wobbles.

For example, 000 shows that the adjacent track at the inner peripheral side, the self-track, and the adjacent track at the outer peripheral side are first phases, and 010 shows that the adjacent track at the inner peripheral side is the first phase, and the self-track is the second phase, and the adjacent track at the outer peripheral side is the third phase.

The periods of these variations depend on the value of β described above, and 360/β tracks are one period. In FIG. 21, when it is an address format in which the wobble is modulated such that the modulation regions are not adjacent to one another, only the pattern of 000 or 010 appears as a phase detection amplitude at the modulation region.

In this case, a ratio of detecting addresses can be improved by correcting the binary threshold value of the phase detection waveform. Such an address format can be realized by largely taking an non-modulation region in a ratio of a modulation region and an non-modulation region shown in FIG. 12.

Method for Correcting Binary Threshold Value

Figure 22:
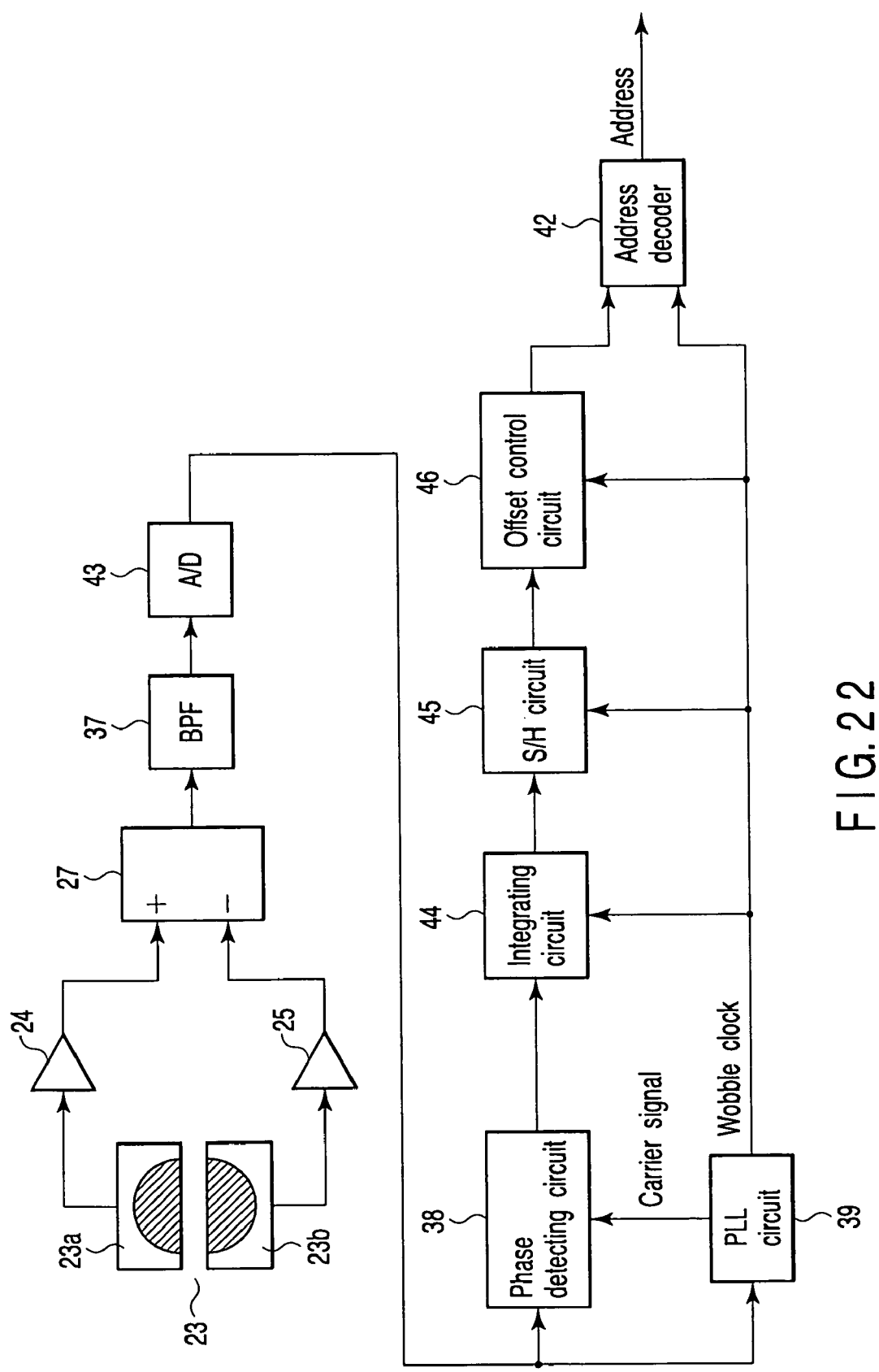
FIG. 22 is a block diagram for explaining an example of an address signal processing circuit in the optical disk apparatus.

FIG. 22 shows the address signal processing circuit 15 having means for correcting a binary threshold value shown in FIG. 1. In FIG. 22, portions which are the same as those of FIG. 15 are denoted by the same reference numerals and will not be described. That is, the phase detection waveform which has been integrated, and sampled and held is input to an offset control circuit 46. In the offset control circuit 46, the asymmetry of the phase detection waveform is corrected. This is equivalent with that a binary threshold value is corrected.

Figure 23:
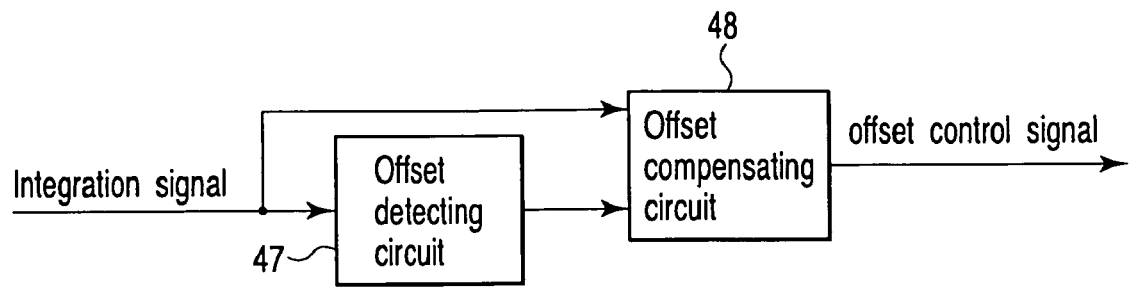
FIG. 23 is a block diagram for explaining an example of an offset control circuit in the address signal processing circuit.
Figure 24:
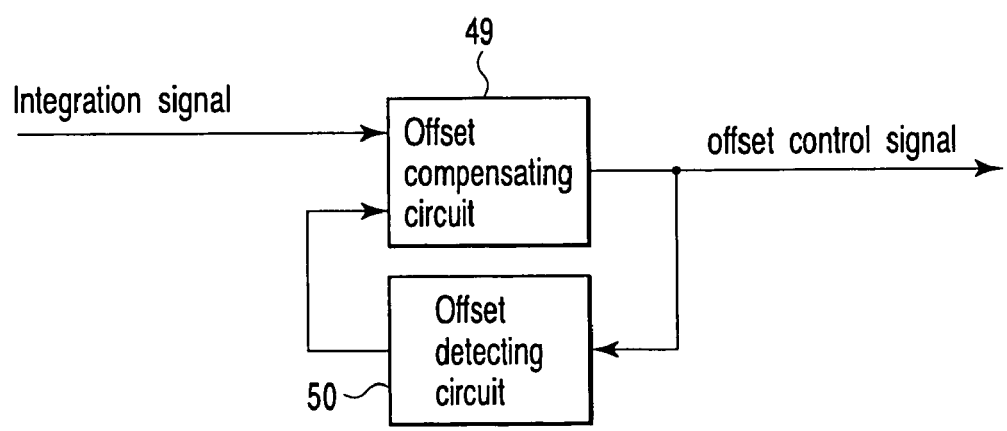
FIG. 24 is a block diagram for explaining another example of an offset control circuit in the address signal processing circuit.

FIGS. 23 and 24 respectively show examples of the offset control circuit 46. FIG. 23 shows the feed-forward type offset control circuit 46, and FIG. 24 shows the feed-back type offset control circuit 46.

In the offset control circuit 46 shown in FIG. 23, asymmetry of the phase detection waveform (integration signal) is calculated at the offset detecting circuit 47, and the asymmetry of the phase detection waveform is compensated by using the offset compensating value calculated at an offset compensating circuit 48.

Further, in the offset control circuit 46 shown in FIG. 24, asymmetry is detected by an offset detecting circuit 50 based on the output from an offset compensating circuit 49, and the asymmetry is compensated due to the detected offset compensating value being fed-back to the offset compensating circuit 49. These offset compensating circuits 48 and 49 can be easily configured by using subtracters.

FIG. 25 shows the offset detecting circuit 47 used for the feed-forward type offset control circuit 46. First, the polarity of the input integral waveform is detected by a polarity detecting circuit 51. A polarity signal output from the polarity detecting circuit 51 is supplied for the control of the S/H circuit 52 and an LPF 53 as is, and is supplied for the control of the S/H circuit 55 and an LPF 56 via a NOT circuit 54.

In accordance therewith, an integral waveform amplitude having a positive polarity is sampled in the S/H circuit 52, and an integral waveform amplitude having a negative polarity is sampled in the S/H circuit 55. This processing is required when the modulation ratios of wobble modulations are different from each other. The values which have been sampled and held at the S/H circuits 52, 55 are respectively passed through the LPF 53, 56, and thereafter, added up at an adder 57.

Cut-off frequencies of the LPF 53 and 56 must be set to be higher than the frequency band of the wobble beat at the inner peripheral side of the optical disk 11 in order to correct the effect of the wobble beat. The value added up via the LPF 53 and 56 is an asymmetry compensating value for the integral waveform amplitude. An offset compensating value is generated by applying a predetermined gain adjustment to the value by an amplifier 58.

Figure 26:
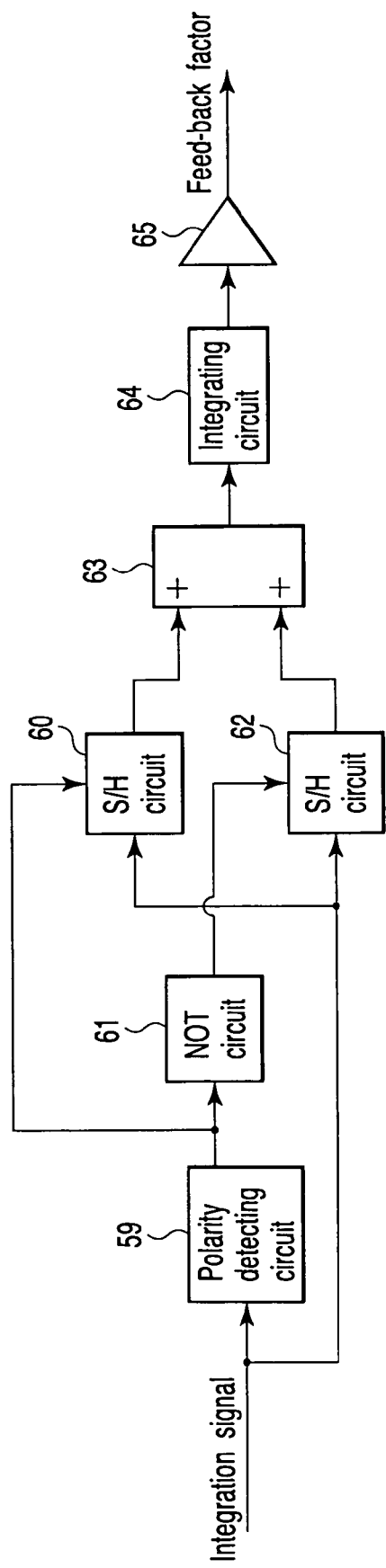
FIG. 26 is a block diagram for explaining another example of an offset detecting circuit in the offset control circuit.

FIG. 26 shows an offset detecting circuit 50 used for the feed-back type offset control circuit 46. First, the polarity of the input integral waveform is detected by a polarity detecting circuit 59. A polarity signal output from the polarity detecting circuit 59 is supplied for the control of an S/H circuit 60 as is, and is supplied for the control of an S/H circuit 62 via a NOT circuit 61.

In accordance therewith, an integral waveform amplitude having a positive polarity is sampled at the S/H circuit 60, and an integral waveform amplitude having a negative polarity is sampled at the S/H circuit 62. The value in which the integral waveform values having the both polarities sampled and held in these S/H circuits 60, 62 are added up at an adder 63 becomes an asymmetric value of the waveform.

In order to eliminate noise components of high-frequency from the asymmetric value, the asymmetric value is made to pass through an integrating circuit 64, and is output after carrying out a predetermined gain control by an amplifier 65. The gain controlled value becomes a feed-back coefficient of the offset control circuit 46, and the control frequency band of the offset control circuit 46 is determined by the gain. However, because there is the possibility that feed-back control disappears when the continuity of the waveform is lost due to track-jump or the like, an integral value in the integrating circuit 64 must be reset.

In the same way as the feed-forward type offset control circuit 46 described above, the control frequency band of the feed-back type offset control circuit 46 must be set to a higher frequency band than the wobble beat frequency at the inner peripheral side of the optical disk 11. Specifically, a gain compressibility of the wobble beat frequency is preferably greater than or equal to 20 dB with respect to the gain characteristic derived by a closed loop transfer function of the feed-back control system.

Figure 27:
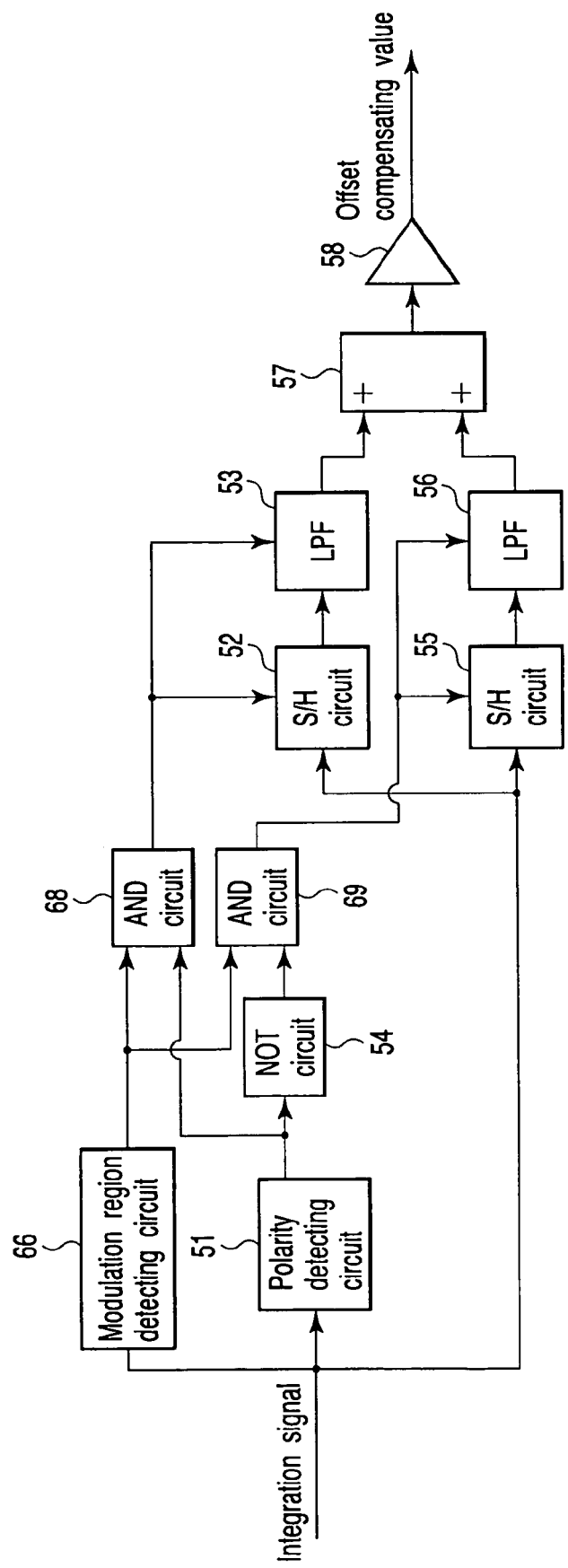
FIG. 27 is a block diagram for explaining another example of an offset detecting circuit in the offset control circuit.
Figure 28:
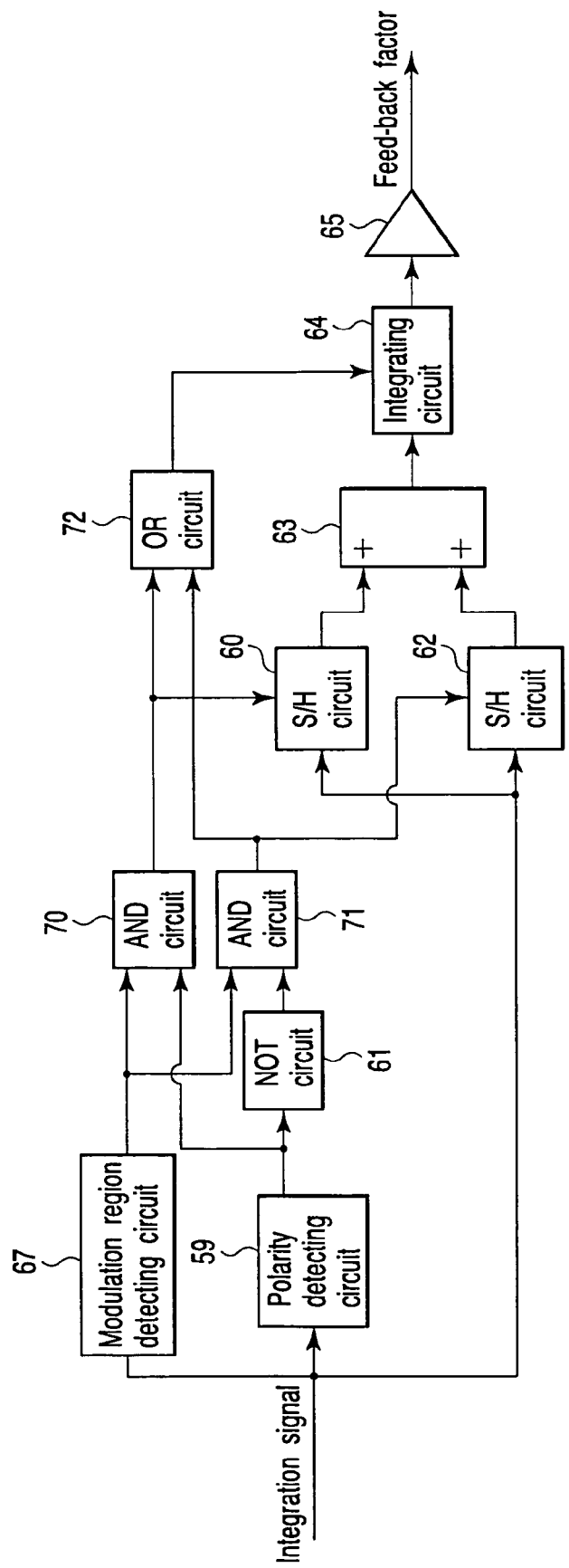
FIG. 28 is a block diagram for explaining a further example of an offset detecting circuit in the offset control circuit.

Further, FIGS. 27 and 28 show circuit configurations in which the offset detecting circuits 47 and 50 respectively shown in FIGS. 25 and 26 are modified such that an offset correction factor with respect to only the modulation region of the wobble is calculated.

In FIGS. 27 and 28, the portions which are the same as those of FIGS. 25 and 26 are denoted by the same reference numerals and will not be described. Modulation region detecting circuits 66 and 67 are newly added therein. Generally, when an address is formed by using a wobble modulation, a predetermined synchronous pattern is recorded in order to generate a timing signal for informing of the incoming of the modulation region. In the modulation region detecting circuits 66 and 67, due to this synchronous pattern being detected, a gate signal of being open at the modulation region portion and being closed at the non-modulation region portion is output.

Further, in FIG. 27, control is carried out by AND circuits 68 and 69 such that an integration signal is sampled and held at the modulation region portion due to a polarity signal and a signal in which the polarity signal is inverted by a NOT circuit 54 being gated by an output of the modulation region detecting circuit 66.

Further, in FIG. 28, control is carried out by AND circuits 70 and 71 such that an integration signal is sampled and held at the modulation region portion due to a polarity signal and a signal in which the polarity signal is inverted by a NOT circuit 61 being gated by an output of the modulation region detecting circuit 67. Moreover, the integrating circuit 64 is driven by the an output in which the outputs of the AND circuits 70 and 71 are gated by an OR circuit 72. However, because there is the possibility that feed-back control disappears when the continuity of the waveform is lost due to track-jump or the like, an integral value in the integrating circuit 64 must be reset.

A typical method for detecting a synchronous pattern is a method in which the threshold value of the output is detected by using a matched filter configured by using an FIR (Finite Impulse Response) type filter or the like. Due to the AND of the gate signal and the polarity detection signal being made to be an enable signal at the following circuit, an offset correction factor can be calculated at only the modulation region.

Effect of Correction in Binary Threshold Value

Figure 29:
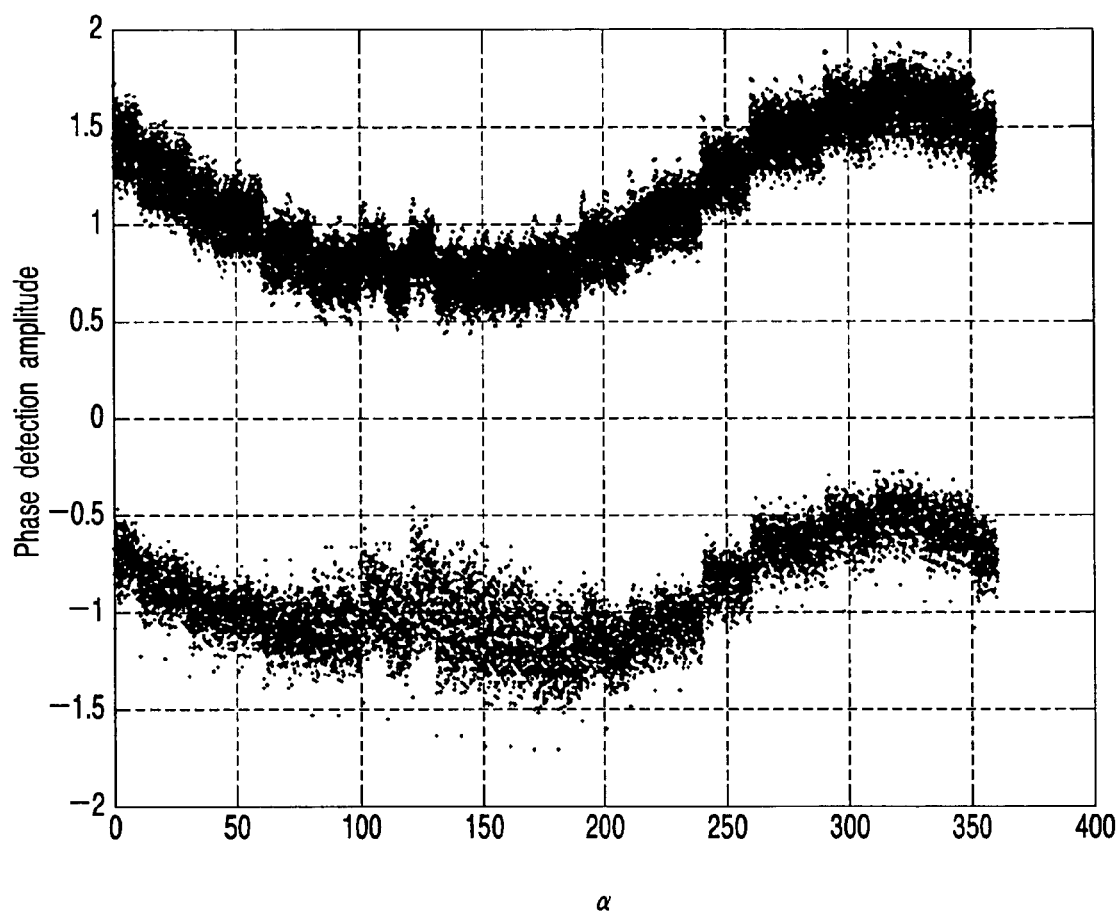
FIG. 29 is a diagram for explaining phase detection amplitudes of a wobble signal when an offset correction is not carried out.
Figure 30:
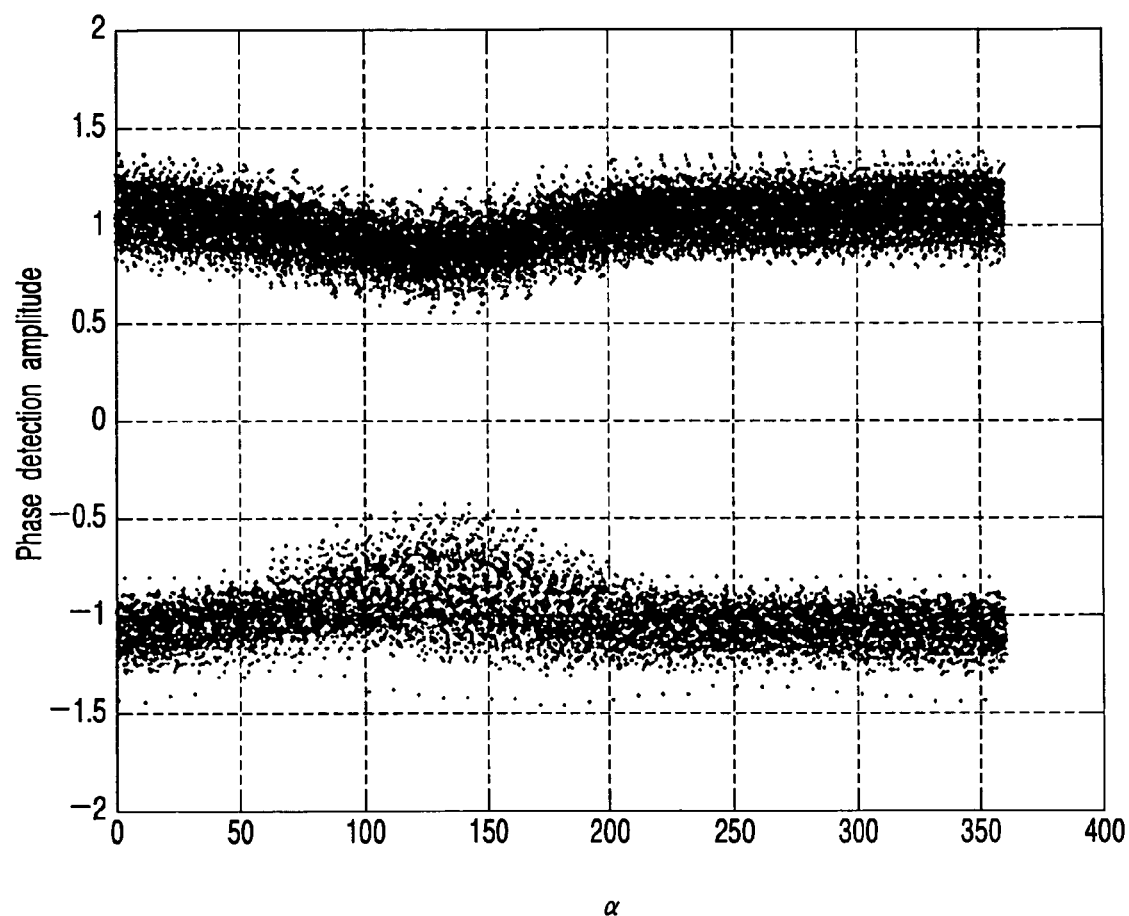
FIG. 30 is a diagram for explaining phase detection amplitudes of a wobble signal when an offset correction in the optical disk apparatus is carried out.

FIG. 29 shows an example of an integral waveform supplied to the address decoder 42 when an offset correction is not carried out, and FIG. 30 shows an example of an integral waveform supplied to the address decoder 42 when an offset correction is carried out.

It can be understood from these drawings that the asymmetry of the waveform is corrected by carrying out offset correction, and levels are symmetrically distributed with 0, which is the threshold level, being the boundary. Because an address bit is decoded due to detection of the threshold value of the integral output, the farther the distance from 0 the level is, the higher the reliability of decoding.

Further, because a deterioration in performance due to crosstalk can be compensated by using asymmetry correction, a track pitch of the optical disk 11 can be made further narrower. Generally, when a track pitch is made narrower, a signal level of the wobble signal is decreased due to the effect of crosstalk caused by the wobbles of the adjacent tracks, and at the same time, the HF signals recorded in the adjacent tracks are added as noise, and therefore, the noise level is increased.

Of these, the signal level of the wobble signal can be ensured due to the effect of crosstalk by the wobbles of the wobble signals being compensated by correction in a threshold value, and the track pitch can be made further narrower than the case in which the correction in a threshold value is not carried out, and a recording capacity can be increased.

Flow of Asymmetry Correction

FIG. 31 shows a flowchart in which the operations of asymmetry correction (also called beat cancellation) described above is summarized. In FIG. 31, the solid lines show the flows of signals, and the dotted lines show the flows of processings. When asymmetry correction processing is started with respect to the phase detection waveform which has passed through the integrating circuit 44 or the LPF 40, first, detection of a modulation region is carried out.

Generally, when an address is formed by using a wobble modulation, a predetermined synchronous pattern is recorded in order to generate a timing signal for informing of the incoming of a modulation region. The modulation region is detected from the synchronous pattern or the address recording portion.

Further, when there is periodicity in the incoming timing of the synchronous pattern and the address recording portion, the periodicity can be utilized. When a current waveform is at the non-modulation region, detection of an asymmetric amount is not carried out, and asymmetry correction processing with respect to the input waveform is carried out by using the asymmetric amount determined at the previous step.

When the current waveform is a waveform at the modulation region, a polarity of the waveform is discriminated. When the waveform is a positive polarity, the amplitude value thereof is detected and maintained. Further, when the waveform is a negative polarity, the amplitude value thereof is detected and maintained. A duty ratio of the wavelength polarities is 50:50 within a frequency band in which the asymmetry correction control is carried out, there is no need to detect the polarities. Next, an asymmetric amount is calculated based on the maintained amplitude values of the respective polarities, and is recorded. Lastly, the waveform is output due to asymmetry correction being carried out by using the recorded asymmetric amount.

Note that the present invention is not limited to the above-described embodiment as is, and disclosed components can be modified and realized within a range which does not deviate from the gist of the present invention at the practical phase. Further, various inventions can be formed due to a plurality of disclosed components which have been disclosed in the embodiment described above being appropriately combined. For example, some of disclosed components may be eliminated from the disclosed components shown in the embodiment. Moreover, disclosed components ranging over the different embodiments may be appropriately combined.

What is claimed is:

1. An optical disk reproduction apparatus comprising:

a wobble signal reading unit configured to read a signal corresponding to a wobble formed at a predetermined track from an optical disk on which address information is recorded by applying phase modulation to the wobble formed at the track;

an address information reproducing unit configured to reproduce the address information by applying phase detecting processing to the wobble signal read at the wobble signal reading unit, and by binarizing an amplitude of an obtained phase detection signal by being compared with a predetermined threshold value;

a correcting unit configured to correct asymmetry of the amplitude generated in the phase detection signal obtained at the address information reproducing unit with respect to the predetermined threshold value at the time of reading the wobble signal from the predetermined track by the wobble signal reading unit;

the correcting unit includes an offset detecting unit configured to calculate an asymmetric amount of the amplitude of the phase detection signal obtained at the address information reproducing unit, and an offset compensating unit configured to compensate the asymmetry of the amplitude of the phase detection signal based on the asymmetric amount calculated at the offset detecting unit; and the offset detecting unit includes a polarity detecting unit configured to detect positive and negative polarities of the phase detection signal obtained at the address information reproducing unit, a first maintaining unit configured to maintain the amplitude of the phase detection signal in a state in which a positive polarity of the phase detection signal has been detected by the polarity detecting unit, a first filter configured to eliminate a high frequency component from an output signal of the first maintaining unit, a second maintaining unit configured to maintain the amplitude of the phase detection signal in a state in which a negative polarity of the phase detection signal has been detected by the polarity detecting unit, a second filter configured to eliminate a high frequency component from an output signal of the second maintaining unit, and an adding unit configured to calculate an asymmetric amount of the amplitude of the phase detection signal by adding an output signal of the first filter and an output signal of the second filter.

2. An optical disk reproduction apparatus according to claim 1, wherein the offset detecting unit includes:

a modulation region detecting unit configured to detect a phase-modulated region of a wobble signal read at the wobble signal reading unit; and a control unit configured to control maintaining operations of the first maintaining unit and the second maintaining unit based on a detection result of the modulation region detecting unit.

3. An optical disk reproduction apparatus according to claim 1, wherein cut-off frequencies of the first filter and the second filter are set to be higher than a frequency band of a wobble beat in which a wobble signal read from the predetermined track periodically fluctuates due to an effect of a wobble signal read from an adjacent track at an inner peripheral side of the optical disk.

4. An optical disk reproduction apparatus comprising:

a wobble signal reading unit configured to read a signal corresponding to a wobble formed at a predetermined track from an optical disk on which address information is recorded by applying phase modulation to the wobble formed at the track;

an address information reproducing unit configured to reproduce the address information by applying phase detecting processing to the wobble signal read at the wobble signal reading unit, and by binarizing an amplitude of an obtained phase detection signal by being compared with a predetermined threshold value; and a correcting unit configured to correct asymmetry of the amplitude generated in the phase detection signal obtained at the address information reproducing unit with respect to the predetermined threshold value at the time of reading the wobble signal from the predetermined track by the wobble signal reading unit, wherein the correcting unit includes an offset compensating unit configured to compensate the asymmetry of the amplitude of the phase detection signal based on the asymmetric amount of the amplitude of the phase detection signal obtained at the address information reproducing unit, and an offset detecting unit configured to calculate an asymmetric amount of the amplitude of the phase detection signal output from the offset compensating unit, and to feed-back it to the offset compensating unit.

5. An optical disk reproduction apparatus according to claim 4, wherein the offset detecting unit includes:

a polarity detecting unit configured to detect positive and negative polarities of the phase detection signal obtained at the address information reproducing unit;

a first maintaining unit configured to maintain the amplitude of the phase detection signal in a state in which a positive polarity of the phase detection signal has been detected by the polarity detecting unit;

a second maintaining unit configured to maintain the amplitude of the phase detection signal in a state in which a negative polarity of the phase detection signal has been detected by the polarity detecting unit;

an adding unit configured to add the amplitude maintained by the first maintaining unit and the amplitude maintained by the second maintaining unit; and an integrating unit configured to calculate an asymmetric amount of the amplitude of the phase detection signal by applying integral processing to an output signal of the adding unit.

6. An optical disk reproduction apparatus according to claim 5, wherein the offset detecting unit includes:

a modulation region detecting unit configured to detect a phase-modulated region of the wobble signal read at the wobble signal reading unit;

a first control unit configured to control driving of the first maintaining unit and the second maintaining unit based on a detection result of the modulation region detecting unit; and a second control unit in which the integrating unit is driven in a state in which the first maintaining unit or the second maintaining unit is driven by a control of the first control unit.

7. An optical disk reproduction apparatus according to claim 4, wherein a control band of a feed-back system formed from the offset compensating unit and the offset detecting unit is set to be higher than a frequency band of a wobble beat in which a wobble signal read from the predetermined track periodically fluctuates due to an effect of a wobble signal read from an adjacent track at an inner peripheral side of the optical disk.

8. An optical disk reproduction method comprising:

reading a signal corresponding to a wobble formed at a predetermined track from an optical disk on which address information is recorded by applying phase modulation to the wobble formed at the track;

reproducing the address information by applying phase detecting processing to the read wobble signal, and by binarizing an amplitude of an obtained phase detection signal by being compared with a predetermined threshold value; and correcting asymmetry of the amplitude generated in the phase detection signal with respect to the predetermined threshold value at the time of reading the wobble signal from the predetermined track, wherein the correcting includes compensating the asymmetry of the amplitude of the phase detection signal based on the asymmetric amount of the phase detection signal obtained in the reproducing the address information, and calculating an asymmetric amount of the amplitude of the phase detection signal output from the compensating the asymmetry of the amplitude of the phase detection signal, and feeding-back it to the compensating the asymmetry of the amplitude of the phase detection signal.

9. An optical disk reproduction method according to claim 8, wherein the correcting includes:

calculating an asymmetric amount of the amplitude of the phase detection signal obtained in the reproducing the address information; and compensating the asymmetry of the amplitude of the phase detection signal based on the calculated asymmetric amount.

10. An optical disk reproduction method comprising:

reading a signal corresponding to a wobble formed at a predetermined track from an optical disk on which address information is recorded by applying phase modulation to the wobble formed at the track;

reproducing the address information by applying phase detecting processing to the read wobble signal, and by binarizing an amplitude of an obtained phase detection signal by being compared with a predetermined threshold value; and correcting asymmetry of the amplitude generated in the phase detection signal with respect to the predetermined threshold value at the time of reading the wobble signal from the predetermined track, wherein the correcting includes detecting a phase-modulated region of the wobble signal, detecting positive and negative polarities of the phase detection signal in a state in which a phase-modulated region has been detected, maintaining an amplitude of the phase detection signal in a state in which a positive polarity has been detected, maintaining an amplitude of the phase detection signal in a state in which a negative polarity has been detected, calculating an asymmetric amount of the amplitude of the phase detection signal based on the positive polarity amplitude and the negative polarity amplitude which have been maintained, and compensating asymmetry of the amplitude of the phase detection signal based on the calculated asymmetric amount.

* * * * *